(12) United States Patent
Nakazato et al.

(10) Patent No.: US 10,288,418 B2
(45) Date of Patent: May 14, 2019

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Yusuke Nakazato, Tokyo (JP); Kazuhiko Kobayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/187,381

(22) Filed: Jun. 20, 2016

(65) Prior Publication Data

US 2016/0379370 A1 Dec. 29, 2016

(30) Foreign Application Priority Data

Jun. 23, 2015 (JP) ................. 2015-125898

(51) Int. Cl.
*G01B 11/26* (2006.01)
*G06K 9/46* (2006.01)
(Continued)

(52) U.S. Cl.
CPC .............. *G01B 11/26* (2013.01); *G01B 11/24* (2013.01); *G06K 9/4604* (2013.01); *G06T 1/0007* (2013.01); *G06T 7/13* (2017.01); *G06T 7/32* (2017.01); *G06T 7/50* (2017.01); *G06T 7/60* (2013.01); *G06T 7/75* (2017.01);
(Continued)

(58) Field of Classification Search
CPC ...... G01S 7/497; G06K 9/4604; H04N 7/183; G01B 11/002; G01B 11/24; G01B 11/26; G06T 2207/30244; G06T 7/70; G06T 1/0007; G06T 2207/10024; G06T 7/13; G06T 7/32; G06T 7/50; G06T 7/60; G06T 7/75

See application file for complete search history.

(56) References Cited

U.S. PATENT DOCUMENTS

| 2008/0266416 A1* | 10/2008 | Kobayashi | ........... H04N 5/2224 348/222.1 |
| 2009/0022365 A1* | 1/2009 | Kotake | ..................... G06K 9/32 382/103 |
| 2009/0110301 A1* | 4/2009 | Schopp | .............. G06K 9/00214 382/224 |

(Continued)

FOREIGN PATENT DOCUMENTS

JP 2011-27623 A 2/2011

*Primary Examiner* — Jingge Wu
(74) *Attorney, Agent, or Firm* — Canon USA, Inc., IP Division

(57) ABSTRACT

To decrease the time and work needed for the measurement of a target object, an information processing apparatus includes an acquisition unit configured to acquire measurement data on a target object from a measuring apparatus, an extraction unit configured to extract a partial region of the target object that contains a geometric feature for use in estimation of a position-and-orientation of the target object, based on one or more pieces of measurement data acquired by the acquisition unit, a determination unit configured to determine a position-and-orientation of the measuring apparatus configured to measure the partial region extracted by the extraction unit, and an output unit configured to output the position-and-orientation determined by the determination unit.

13 Claims, 10 Drawing Sheets

(51) Int. Cl.
  *G06T 7/60* (2017.01)
  *G01B 11/24* (2006.01)
  *G06T 1/00* (2006.01)
  *G06T 7/32* (2017.01)
  *G06T 7/73* (2017.01)
  *G06T 7/50* (2017.01)
  *G06T 7/13* (2017.01)
(52) U.S. Cl.
  CPC ............... *G06T 2207/10024* (2013.01); *G06T 2207/10028* (2013.01)

(56) References Cited

U.S. PATENT DOCUMENTS

| | | | |
|---|---|---|---|
| 2011/0206274 A1* | 8/2011 | Tateno | G06T 7/75 382/154 |
| 2011/0211066 A1* | 9/2011 | Fujiki | H04N 7/181 348/135 |
| 2013/0121592 A1* | 5/2013 | Fujiki | G01B 11/002 382/195 |
| 2013/0151007 A1* | 6/2013 | Valpola | B25J 9/1694 700/245 |
| 2013/0230235 A1* | 9/2013 | Tateno | G06T 19/003 382/154 |
| 2013/0238128 A1* | 9/2013 | Suzuki | B25J 9/1669 700/258 |
| 2014/0067126 A1* | 3/2014 | Watanabe | B25J 9/1697 700/259 |
| 2014/0219502 A1* | 8/2014 | Hirota | G01B 11/002 382/103 |
| 2016/0279791 A1* | 9/2016 | Watanabe | B25J 9/1612 |

* cited by examiner

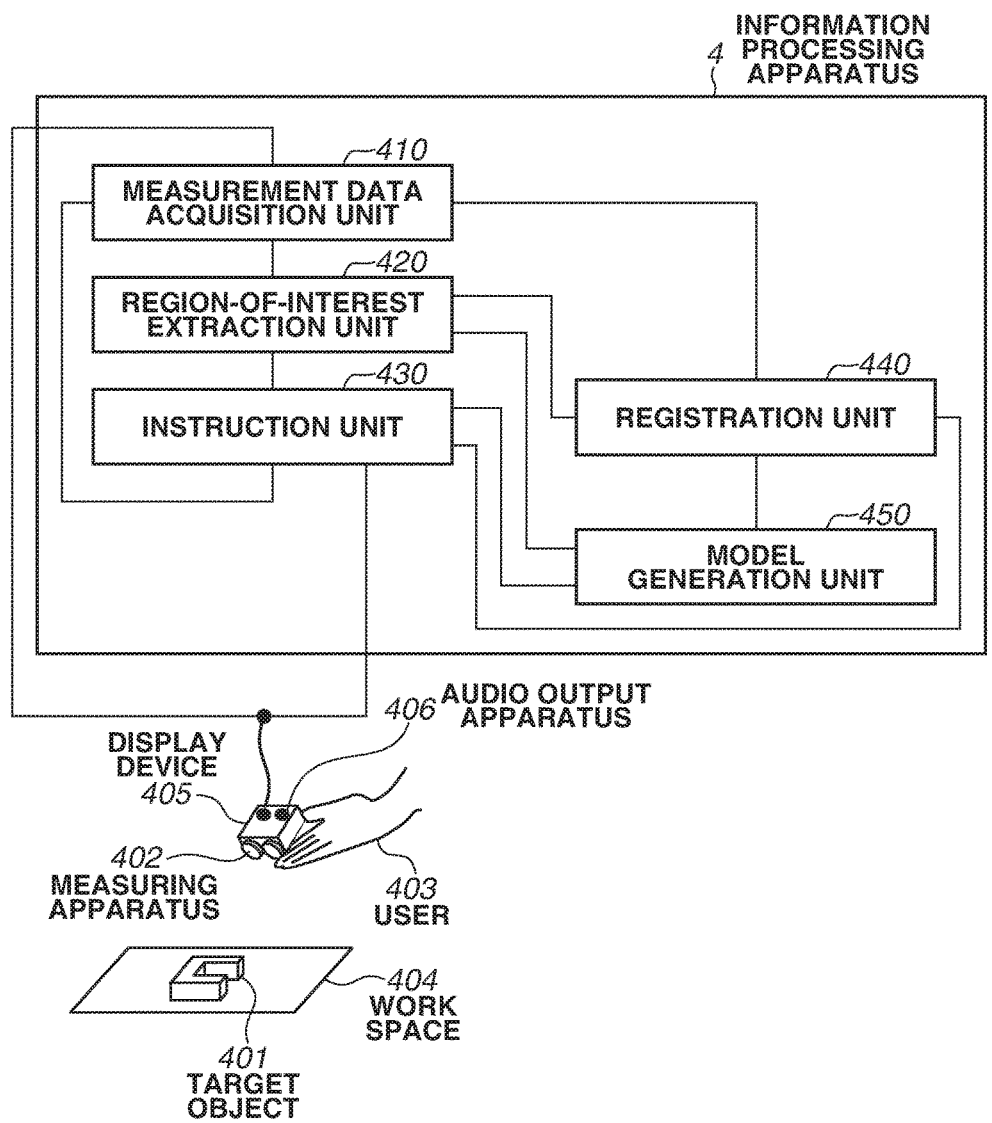

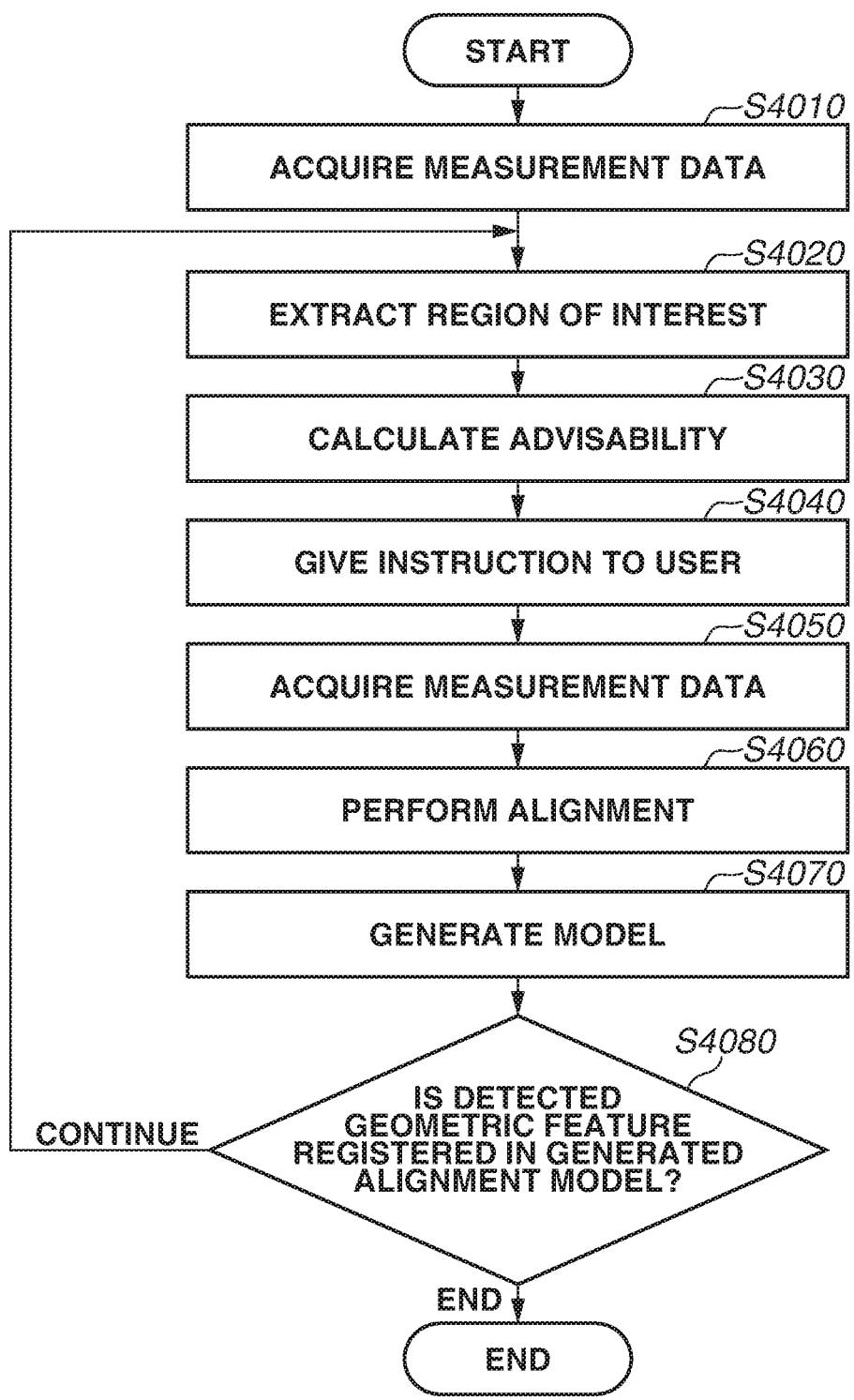

INFORMATION PROCESSING APPARATUS, INFORMATION PROCESSING METHOD, AND STORAGE MEDIUM

BACKGROUND OF THE INVENTION

Field of the Invention

The present disclosure generally relates to information processing and, more particularly, to information processing apparatuses, information processing methods, and storage mediums.

Description of the Related Art

There is a technique called model fitting for estimating the position-and-orientation of a target object from a range image and a grayscale image acquired by observation of the target by use of three-dimensional shape information (registration model) about the target object. Japanese Patent Application Laid-Open No. 2011-27623 discusses a technique for estimating position-and-orientation parameters by associating a geometric feature extracted from a computer-aided design (CAD) model of a component as a registration model with a geometric feature detected from a captured range image and a captured grayscale image of a target object and then using the distance between the associated geometric features as an evaluation value. With the foregoing technique for estimating the position-and-orientation of a target object, a hand position for picking a component by a robot can be calculated.

There is a reverse engineering technique for generating a three-dimensional shape model of a target object to be used for generating a registration model from range images measured from a plurality of position-and-orientations. In general, the shape reconstruction by reverse engineering includes the following operations. Specifically, the shape reconstruction includes capturing range images from different position-and-orientations a number of times using a distance measuring apparatus, removing noise from a range point group of the enormous number of range images using dedicated software, registering the range images (three-dimensional point group), curve fitting, etc. Further, there is a technique for the three-dimensional reconstruction using multi-view point images to reconstruct the three-dimensional shape of a target object from an image group of the target object captured a large number of times from different position-and-orientations using a camera for capturing two-dimensional images.

In order to measure a target object a large number of times from different position-and-orientations to generate a model of the target object, the operation of moving a measuring apparatus or the target object and measuring the target object needs to be repeated a large number of times. Accordingly, the measurement requires a large amount of time and work. Furthermore, when a model has been generated after the completion of the measurement repeated a large number of times, it is often found that the measurement is not sufficient because there is an unmeasured area or because the three-dimensional shape is not accurately reconstructed due to a large amount of noise, etc. In this case, additional measurement needs to be performed, thereby requiring more time and work.

SUMMARY OF THE INVENTION

According to an aspect of the present disclosure, an information processing apparatus disclosed in the present specification includes an acquisition unit configured to acquire measurement data on a target object from a measuring apparatus, an extraction unit configured to extract a partial region of the target object that contains a geometric feature for use in estimation of a position-and-orientation of the target object, based on one or more pieces of measurement data acquired by the acquisition unit, a determination unit configured to determine a position-and-orientation of the measuring apparatus configured to measure the partial region extracted by the extraction unit, and an output unit configured to output the position-and-orientation determined by the determination unit.

According to the present disclosure, the time and work needed for the measurement of an object can be reduced.

Further features of the present disclosure will become apparent from the following description of exemplary embodiments with reference to the attached drawings.

BRIEF DESCRIPTION OF THE DRAWINGS

FIG. 9 illustrates an example of a software configuration of an information processing apparatus (No. 4).

FIG. 10 is a flow chart illustrating an example of information processing of the information processing apparatus (No. 4).

DESCRIPTION OF THE EMBODIMENTS

Figure 1:
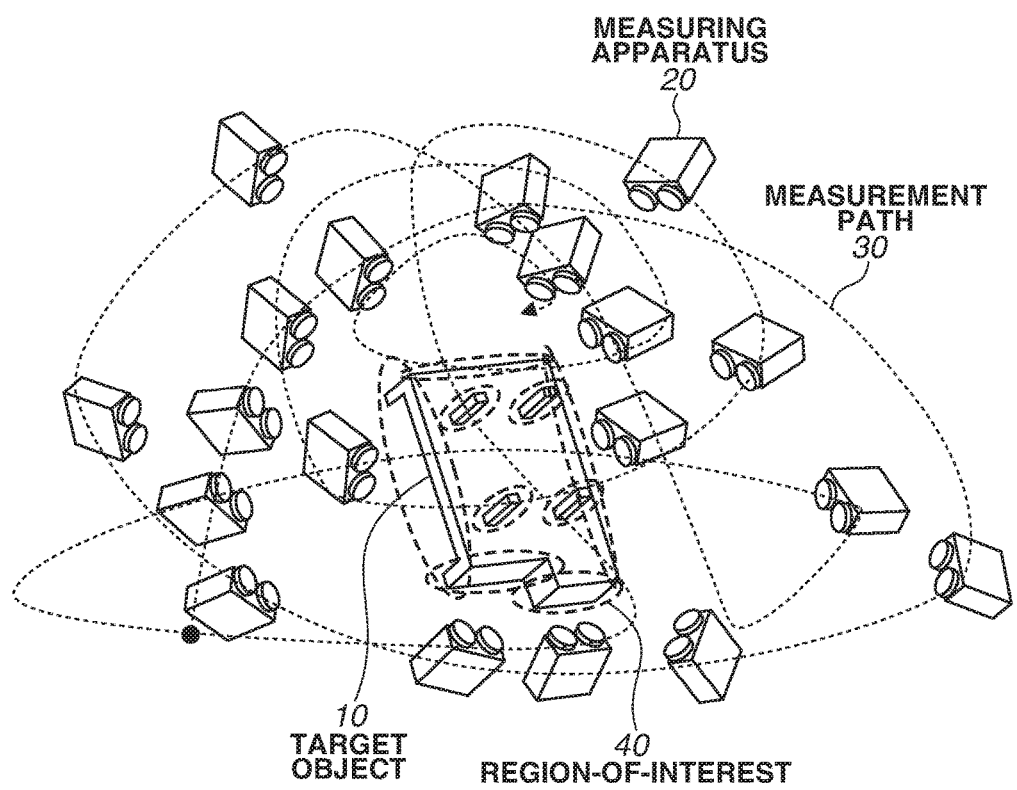
FIG. 1 illustrates an example of measurement of a target object using a measuring apparatus.

Various exemplary embodiments of the present disclosure will be described below with reference to the drawings.

The terms used in the following exemplary embodiments will be described. First, the term "registration model" refers to three-dimensional shape information about a target object for use in the calculation of the position-and-orientation of the target object by model fitting, and includes a set of geometric features expressing the three-dimensional shape. Further, the term "geometric feature" refers to a graphic feature included in an imaging region of a measurement target object in a range image, a grayscale image, or a three-dimensional shape model. Features such as edges and corners, and three-dimensional features such as curvature distributions and normal distributions are also included in the geometric features. Further, the term "range image" refers to an image having a distance to a surface of a measurement target object observed from a specific viewpoint, and may be in the form of a grid image or in the form of a list. Further, the term "grayscale image" refers to a reflection image reflected by a surface of a measurement target object observed from a specific viewpoint. The grayscale imaged include not only a luminance image in which luminance is stored in each pixel but also an image in which luminance for each wavelength such as red (R), green (G), blue (B), etc. of visible light or infrared light is stored in each pixel. Further, the term "three-dimensional shape model" refers to a model that represents the three-dimensional shape of a target object. The three-dimensional shape model is information that indicates the three-dimensional shape of a target object, such as a three-dimensional computer-aided design (CAD) model that is a set of analytic curved surfaces, a mesh model that is a set of local flat surfaces including a three-dimensional point group and connection information about the three-dimensional point group, a set of three-dimensional points, a set of three-dimensional points and information about normals of the three-dimensional points. Further, as to the term "position-and-orientation," the position can be expressed by (X, Y, Z) as a three-dimensional expression in a Euclidean space, and the orientation can be expressed by six-degree-of-freedom parameters of amounts of rotation about respective axes. Further, the term "measurement position-and-orientation" refers to the relative position-and-orientation of a measuring apparatus with respect to a target object. Further, the term "registration" refers to the operation of calculating a relative position between pieces of measurement data and calculating position-and-orientation parameters for the conversion into a single coordinate system. Further, the term "positioning mechanism" refers to a system including an actuator configured to drive and move an object, and a control mechanism for controlling the actuator to move the object to a predetermined position according to an instruction value. A commonly used industrial robot includes a plurality of joint axes, and feedback control is performed on a motor of each axe using values output from an encoder configured to detect a rotation angle, whereby an orientation at a predetermined position and a predetermined angle can be reproduced.

A first exemplary embodiment will be described below. In the present exemplary embodiment, information processing for generating a registration model for the estimation of the position-and-orientation of a target object from measurement data on the target object will be described.

An outline of a measurement operation according to the present exemplary embodiment is illustrated in FIG. 1. The measurement of a target object 10 is performed a large number of times around the target object 10 with a measuring apparatus 20, and the plurality of pieces of measurement data is integrated to generate the registration model for use in the estimation of the position-and-orientation of the target object 10. The measuring apparatus 20 can be moved to an arbitrary position and an arbitrary orientation by a positioning mechanism such as a robot arm to perform measurement. The measuring apparatus 20 is moved on an initially set measurement path 30. Then, a region-of-interest 40 containing a geometric feature to be registered in the registration model for use in the estimation of the position-and-orientation of the target object 10 is minutely measured, while other regions are roughly measured, whereby the necessary and sufficient measurement for generation of the registration model is performed. In this way, the number of times the measurement needs to be performed can be decreased, compared to a case where the measurement is performed at regular intervals, whereby the time and work needed for the measurement can be decreased.

In the estimation of the position-and-orientation of the target object by model fitting, an information processing apparatus associates a geometric feature detected from measurement data with a three-dimensional geometric feature registered in the registration model and minimizes the distance between the associated geometric features. In this way, the information processing apparatus calculates position-and-orientation parameters. Therefore, a three-dimensional geometric feature that corresponds to a geometric feature detected from measurement data needs to be registered in the registration model. Thus, in the present exemplary embodiment, a region where many geometric features are detected from measurement data is determined as a region of interest, and a method for measuring the region of interest minutely is described.

The registration model according to the present exemplary embodiment includes a geometric feature including three-dimensional points on a front surface having normal information and a geometric feature including three-dimensional points on a contour having direction information that are sampled from a three-dimensional shape model of the target object. The three-dimensional points on the front surface and the normal information are used in the fitting into a range image, and the three-dimensional points on the contour and the direction information are used in the fitting into a grayscale image.

Figure 2:
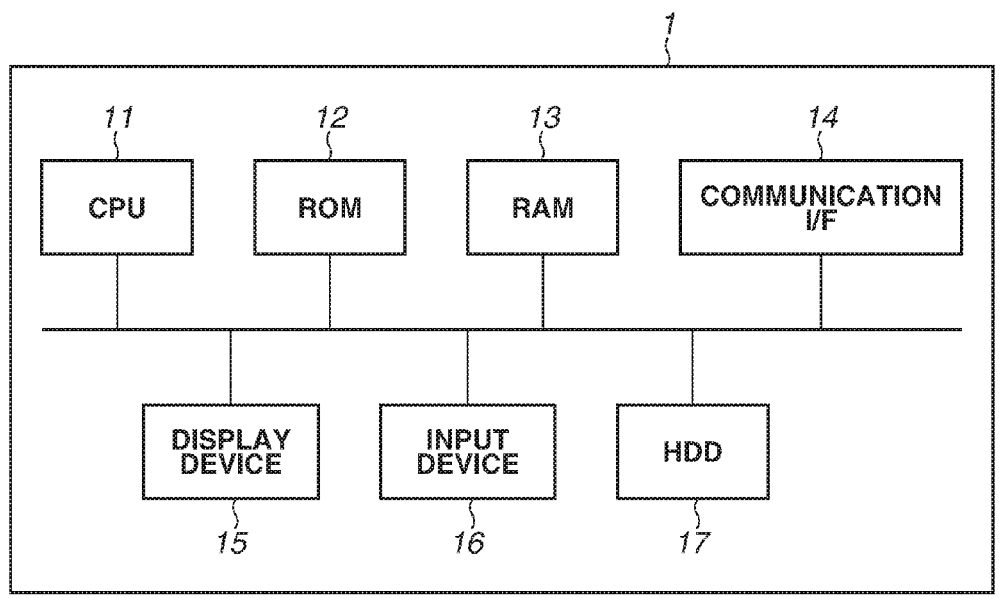
FIG. 2 illustrates an example of a hardware configuration of an information processing apparatus.

FIG. 2 illustrates an example of a hardware configuration of an information processing apparatus 1. The information processing apparatus 1 includes, as the hardware configuration, a central processing unit (CPU) 11, which may include one or more processors, a read-only memory (ROM) 12, a random access memory (RAM) 13, a communication interface (I/F) 14, a display device 15, an input device 16, and a hard disk drive (HDD) 17. The CPU 11 controls various devices of the information processing apparatus 1 connected to a system bus. The ROM 12 stores a basic input/output system (BIOS) program and a boot program. The RAM 13 is used as a main memory of the CPU 11. The communication I/F 14 connects the information processing apparatus 1 to a network and controls information communication performed via the network. The connection to the network may be wired connection, wireless connection, or wired and wireless connection. The display device 15 displays results of processing performed by the CPU 11. The input device 16 receives an operator input. The input device 16 may be, for example, a mouse, a keyboard, or a remote controller described below. The HDD 17 stores an operating system (OS) program, various types of application programs to be run on the OS, etc. As used herein, the term "unit" generally refers to any combination of software, firmware, hardware, or other component, such as circuitry, that is used to effectuate a purpose.

In the foregoing configuration, when a power source of the information processing apparatus 1 is turned on, the CPU 11 reads the OS program from the HDD 17 into the RAM 13 and executes processing according to the boot program stored in the ROM 12, thereby realizing functions of the information processing apparatus 1. Specifically, the CPU 11 of the information processing apparatus 1 executes processing according to the program to realize the software configuration of the information processing apparatus 1 and processing of a flow chart described below.

The hardware configuration illustrated in FIG. 2 is a mere example, and the information processing apparatus 1 may include, for example, a plurality of CPUs, HDDs, and communication interfaces.

Figure 3:
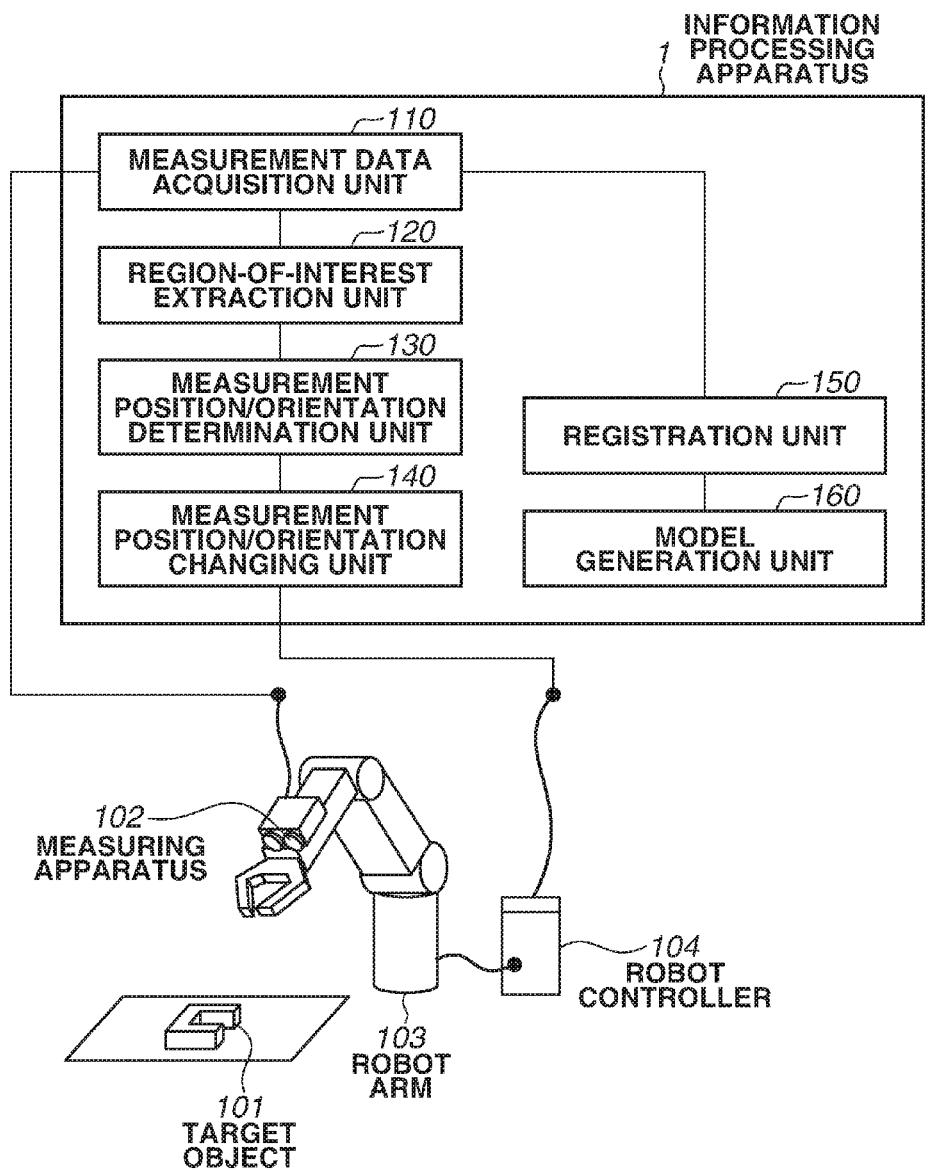
FIG. 3 illustrates an example of a software configuration of an information processing apparatus (No. 1).

The software configuration of the information processing apparatus 1 is illustrated in FIG. 3.

A measurement data acquisition unit 110 acquires a range image and a grayscale image that contain a measurement target object 101 via a measuring apparatus 102 including a projection device and an image capturing device. The range image is acquired by, for example, the following method. A structural pattern is projected from the projection device. Then, the measurement data acquisition unit 110 decodes the pattern in an image reflected by a target surface and captured by the image capturing device, thereby identifying the projection position of the projection device. Based on the image position relationship between the captured image and the projected image, the measurement data acquisition unit 110 calculates the distance by triangulation. Further, the measurement data acquisition unit 110 can acquire the grayscale image as follows. Specifically, the projection device projects light without a pattern, or the projection is not performed and the image capturing device captures an image. A camera including an image sensor such as a charge-coupled device (CCD) sensor, and a complementary metal oxide semiconductor (CMOS) sensor can be used as the image capturing device.

A region-of-interest extraction unit 120 extracts a region of interest, as a region to be measured, from the target object, based on the measurement data. The region of interest refers to a region containing more geometric features that are to be used in the estimation of the position-and-orientation of a target object and are to be detected from the measurement data than other regions. In the present exemplary embodiment, the region-of-interest extraction unit 120 calculates, from the measurement data, a feature amount having a correlation with a geometric feature to be used in the estimation of the position-and-orientation of the target object 101, and extracts, as a region of interest, a partial region having the feature amount that is larger than a set value from the measurement data. In the estimation of the position-and-orientation of a target object, the information processing apparatus 1 detects a characteristic geometric feature from a grayscale image and associates the detected geometric feature with the registration model. Thus, in the present exemplary embodiment, a method will be described in which the region-of-interest extraction unit 120 extracts a region of interest of the target object using the grayscale image measured in the previous frame as measurement data. The region-of-interest extraction unit 120 segments a region of the target object captured in the grayscale image into pieces of arbitrary size, calculates, for each local region, a feature amount having a correlation with the geometric feature of the measurement data to be used in the estimation of the position-and-orientation of the target object, and selects, as a region of interest, a region of which the calculated value is equal to or larger than a threshold value.

In a case of using contour information in the estimation of the position-and-orientation, the information processing apparatus 1 associates an edge detected from the grayscale image with a three-dimensional edge registered in the registration model and including three-dimensional points of a contour and directions of the three-dimensional points, and minimizes the distances between the associated edges to calculate the position-and-orientation. Therefore, a three-dimensional edge that corresponds to the detected edge needs to be registered in the registration model. A spatially high-frequency shape portion where many edges are detected from the grayscale image is difficult to measure the distance, so that the measurement data is likely to be deficient. Thus, such a region needs to be measured a large number of times from a plurality of viewpoints to compensate for deficiency before the acquisition of the shape.

The image frequency of an image region where an edge is detected from the grayscale image is likely to be high. Thus, the region-of-interest extraction unit 120 performs frequency conversion using a fast Fourier transform (FFT) on each local region of the grayscale image and applies a frequency filter appropriate for an edge detection operator. In the present exemplary embodiment, the region-of-interest extraction unit 120 applies a band-pass filter that removes high frequency components responsive to pixel noise such as dark current noise and low frequency components that are easy to measure the distance and from which no edge is detected. Then, the region-of-interest extraction unit 120 determines the sum of outputs of the band-pass filter as a feature amount. From a region with a higher feature amount, an edge that is a geometric feature of the measurement data to be used in the estimation of the position-and-orientation of the target object is more likely to be detected. Accordingly, the region-of-interest extraction unit 120 can extract a region in which the distance of the target object is difficult to measure. The region-of-interest extraction unit 120 can determine a design value of the band-pass filter based on the dark current noise of the image capturing device to be used, conditions of a light source in the image capturing environment, and the minimum measurement area of the measuring apparatus 20. The feature amount described above is an example of a feature amount relating to an image feature.

A measurement position/orientation determination unit 130 determines the position-and-orientation of the measuring apparatus 20 in the next measurement of the target object 101 based on the region extracted by the region-of-interest extraction unit 120. In the present exemplary embodiment, a path (trajectory) along which the measuring apparatus 20 is to be moved is given in advance, and the position-and-orientation of the measuring apparatus 20 is determined on the path. In the present exemplary embodiment, measurement position-and-orientations from which the target object is captured at the center are smoothly interpolated to form the path, and the path is set to observe the target object from all directions as illustrated in FIG. 1. The measurement position/orientation determination unit 130 can calculate the interpolation of positions using spline interpolation and Lagrange interpolation, and can calculate the interpolation of orientations using a linear interpolation (lerp) operation or a spherical linear interpolation (slerp) operation using quaternions. In a case where a region of interest is detected from the measurement data of the previous frame at the region-of-interest extraction unit 120, the measurement position/orientation determination unit 130 performs the following processing based on the assumption that a region of interest is likely to be measured also from neighboring viewpoints. Specifically, the measurement position/orientation determination unit 130 determines, as the next measurement position-and-orientation, a position-and-orientation that is moved by a predefined minimum step size on the path from the current position-and-orientation of the measuring apparatus. On the other hand, in a case where no region of interest is detected, the measurement position/orientation determination unit 130 determines, as the next measurement position-and-orientation, a position-and-orientation that is moved by a predefined maximum step size on the path.

A measurement position/orientation changing unit 140 changes the relative position-and-orientations of the target object and the measuring apparatus used by the measurement data acquisition unit 110. The target object 101 is placed in a resting state in a work space. A robot arm 103 including the measuring apparatus 102 attached to a front end of the arm is used as a positioning mechanism for the measuring apparatus 102 to enable measurement of the target object from the position-and-orientations on the preset path. The measurement position/orientation changing unit 140 instructs a robot controller 104 to move the measuring apparatus 102 to the position-and-orientation determined by the measurement position/orientation determination unit 130. Based on the instruction, the robot controller 104 moves the measuring apparatus 102 to the position-and-orientation determined by the measurement position/orientation determination unit 130.

A registration unit 150 performs registration of range images measured by the measurement data acquisition unit 110 and outputs a three-dimensional mesh model in which the range images are integrated into a single coordinate system. When a range image includes distances to targets located in the form of a grid, the registration unit 150 can generate a mesh having adjacent grid points as vertexes. The registration unit 150 calculates relative position-and-orientations of mesh models of the range images using an Iterative Closest Points (ICP) algorithm, etc. and integrates the calculated position-and-orientations. The ICP algorithm uses initial values of the position-and-orientations. In the present exemplary embodiment, however, the position-and-orientation of the measuring apparatus is controlled by the robot arm 103, so that the registration unit 150 sets the initial values of the position-and-orientations based on the control values. Further, if the robot arm 103 can be controlled with high accuracy, the registration unit 150 may perform the registration between pieces of measurement data using the position-and-orientations of the control values without applying the ICP algorithm. The registration unit 150 can calculate the relative position-and-orientations of the range images using the ICP algorithm even if the range images are not converted into a mesh model and three-dimensional point groups is used. Further, the registration unit 150 may use a method in which a mesh is expressed as voxels and a mesh is generated for the region, and a method of generating a mesh by Delaunay triangulation with respect to point groups. As to the shape of a detailed portion that cannot be reconstructed from the range images used in the actual estimation of the position-and-orientation, a shape with an even higher resolution is difficult to detect by a sampling theorem, so that it is not necessary to reconstruct an excessively detailed shape as the three-dimensional shape of a target.

A model generation unit 160 generates a registration model for use in the estimation of the position-and-orientation of a component from the three-dimensional mesh model of the measurement data registered by the registration unit 150. The model generation unit 160 samples three-dimensional points of surface points, normals of the three-dimensional points, three-dimensional points of contours, and directions of the three-dimensional points of the contours at a designated density from the mesh model and registers the three-dimensional points of the surface points, the normals of the three-dimensional points, the three-dimensional points of the contours, and the directions of the three-dimensional points of the contours in the registration model. At this time, the model generation unit 160 registers the geometric features by observable viewpoint so that a process of determining the visibility of a geometric feature can be omitted in the estimation of the position-and-orientation of the target object.

Figure 4:
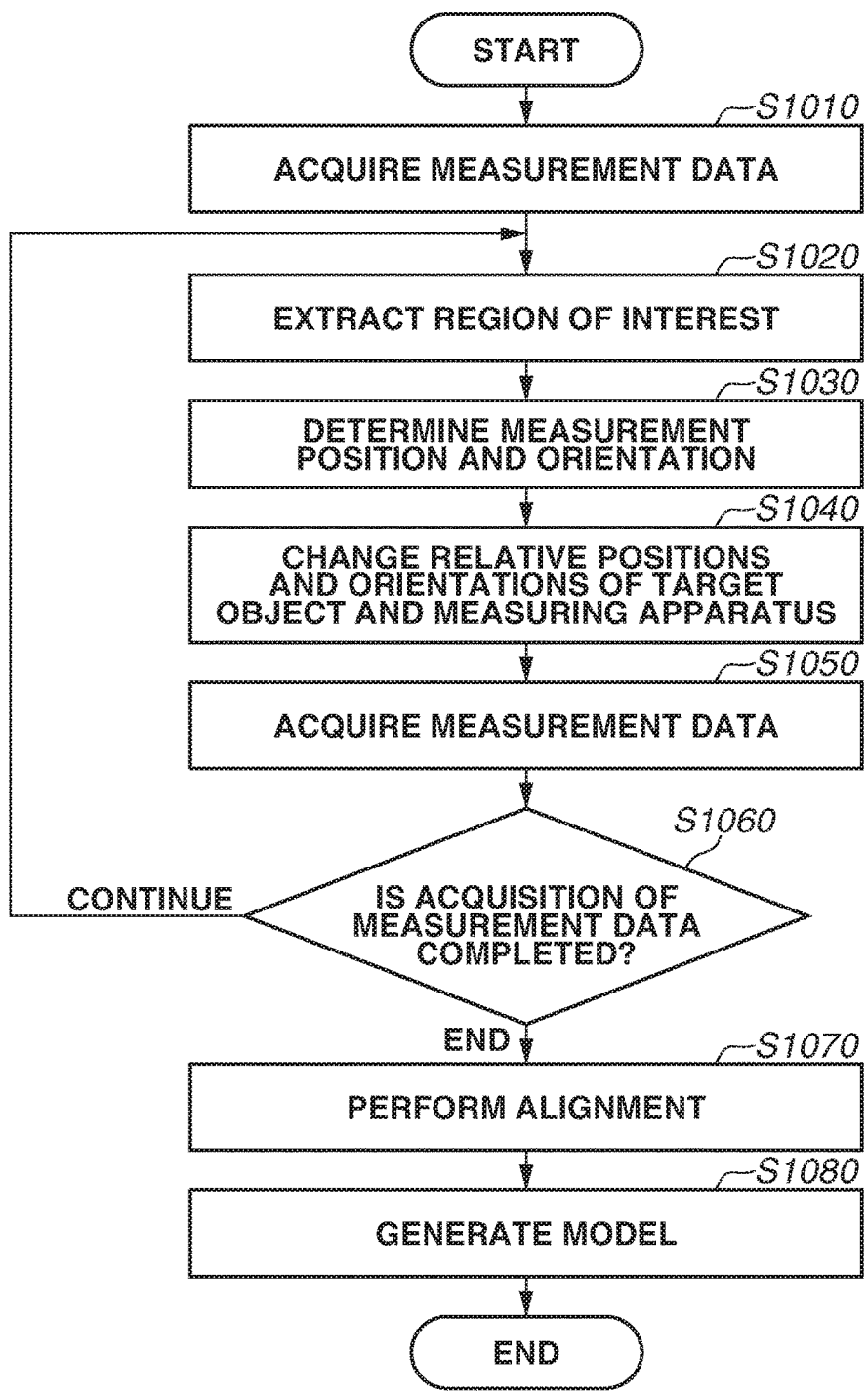
FIG. 4 is a flow chart illustrating an example of information processing of the information processing apparatus (No. 1).

FIG. 4 is a flow chart illustrating information processing performed by the information processing apparatus according to the first exemplary embodiment. The calibration of the measuring apparatus, the robot arm and the like and the setting of the measurement position-and-orientation path are completed in advance.

First, in step S1010, the measurement data acquisition unit 110 acquires measurement data on the target object. Specifically, the measurement data acquisition unit 110 acquires range images and grayscale images that contain the target object.

Next, in step S1020, the region-of-interest extraction unit 120 extracts a partial region (region of interest) of the target object that is to be measured, based on the measurement data. Specifically, the region-of-interest extraction unit 120 extracts, from each of the grayscale images, a local region containing a geometric feature to be used in the measurement of the position-and-orientation of a component.

Then, in step S1030, the measurement position/orientation determination unit 130 determines a position-and-orientation for the next measurement of the target object. In other words, in a case where the region of interest is detected, the measurement position/orientation determination unit 130 determines, as the next measurement position-and-orientation, a position-and-orientation that is moved by the minimum step size on the path. On the other hand, in a case where the region of interest is not detected, the measurement position/orientation determination unit 130 determines, as the next measurement position-and-orientation, a position-and-orientation that is moved by the maximum step size on the path.

Next, in step S1040, the measurement position/orientation changing unit 140 changes the relative position-and-orientations of the target object and the measuring apparatus to the position-and-orientations determined in step S1030.

Next, in step S1050, the measurement data acquisition unit 110 acquires measurement data again. In other words, the measurement data acquisition unit 110 acquires range images and grayscale images that contain the target object.

Next, in step S1060, for example, the measurement position/orientation changing unit 140 determines whether the acquisition of measurement data is completed. As to a completion condition, the acquisition of measurement data is determined to be completed if the entire preset path is passed. A completion determination method is not limited to the foregoing method, and any method can be used by which whether sufficient measurement data for the generation of a registration model is collected can be determined. For example, the measurement position/orientation changing unit 140 may perform the determination based on the number of measurements or data amount. Further, a three-dimensional point group that is measurement data may be mapped on a voxel space, and the measurement data acquisition may be ended if the density of each voxel becomes equal to or higher than a threshold value. If the measurement position/orientation changing unit 140 determines that the measurement is still insufficient ("continue" in step S1060), for example, the processing returns to step S1020. On the other hand, if the measurement position/orientation changing unit 140 determines that the measurement is sufficient ("end" in step S1060), for example, the processing proceeds to step S1070. The processing of step S1060 may be performed by another unit.

In step S1070, the registration unit 150 registers all the acquired pieces of measurement data. Specifically, the registration unit 150 unifies the coordinate systems of the range images and outputs a mesh model of the range images.

Lastly, in step S1080, the model generation unit 160 extracts a geometric feature for use in the measurement of the position-and-orientation of the component from the mesh model generated based on the measurement data. In other words, the model generation unit 160 samples three-dimensional points of surface points, normals of the three-dimensional points, three-dimensional points of contours, and directions of the three-dimensional points from the mesh model, and outputs the three-dimensional points of the surface points, the normals of the three-dimensional points, the three-dimensional points of the contours, and the directions of the three-dimensional points as a registration model. With the foregoing processing, the number of times the measurement is performed can be decreased, compared to a case where the measurement is performed at regular intervals, whereby the time and work needed for the measurement can be decreased.

A method for the estimation of the position-and-orientation of a target object and a registration model according to the present exemplary embodiment are not limited to those described above. Any position-and-orientation estimation method may be used as long as the method is based on model fitting, and range images may be used alone as measurement data, or grayscale images may be used alone as measurement data. Further, the registration model may be any registration model as long as it includes a necessary geometric feature for the model fitting according to the position-and-orientation estimation method. In the case where only range images are used in the position-and-orientation estimation method, the registration model may contain only the three-dimensional points on the surface and the normals of the three-dimensional points. In the case where only grayscale images are used, the registration model may contain only the three-dimensional points on the contour and the directions of the three-dimensional points. Further, the geometric features to be fitted to the range images are not limited to those described above. Any geometric feature that represents a front surface of a target object may be used. The geometric features may be only three-dimensional points on a front surface, local plane information representing a front surface such as a triangular patch, or a mathematical formula representing a front surface. Further, a method by which a geometric feature can be detected and identified can be used, such as a method of identification based on a histogram obtained by projecting normal vectors in the vicinity of a region of interest onto a cylinder, a method using differences in depth between two points, and a method of calculating a curvature of a local region. Further, the geometric features to be fitted to the grayscale images are not limited to those described above and may be any geometric feature that can be detected from a grayscale image and that a correspondence to a three-dimensional shape model can be calculated. Various methods by which a geometric feature can be detected and identified may be used, such as a Harris operator for detecting corner points, a Sobel or Canny operator for detecting edges, a method for detecting texture densities and directions, and a method using color histograms and local region gradient histograms.

While the measuring apparatus described in the present exemplary embodiment is a combination of the projection device and the image capturing device, an image capturing device for capturing grayscale images may be used separately from an image capturing device for capturing range images. Further, the projection device may be a projector or a device that includes a mask pattern disposed in front of a light source, and may be any device that can projects a structural pattern. The grayscale image may be a color image using a three-color filter. Further, wavelengths of infrared or ultraviolet light besides visible light may be used, or fluorescence may be observed. Camera parameters of the projection device and the image capturing device, such as lens distortion, are calibrated in advance. Further, the formats and image sizes of the range images and the grayscale images may be set according to the system. Further, a method of acquiring a range image is not limited to the method described above. A stereo camera may be used in which relative position-and-orientations of two or more cameras are calibrated in advance and used. Further, a method including applying random dots, calculating a local correlation coefficient of an image, performing association based on the correlation strength, and calculating the distance by triangulation based on stereo parameters may be used. Further, a time-of-flight (TOF) range image acquiring method may be used that measures the time from the point when light is emitted to the point when the light is reflected and returned. A range image may be used that is acquired, using a line laser, by measuring the reflection position of the laser when a target is moved in a straight line, and converting the measured reflection position into a three-dimensional position. In the present exemplary embodiment, any method may be used to acquire a range image. Further, the measuring apparatus may include only a range measuring apparatus or only a camera configured to measure a grayscale image.

A feature amount for use in the extraction of a region of interest in the region-of-interest extraction unit 120 that is not limited to the feature amount described above, and any feature amount having a correlation with a geometric feature for use in the measurement of the position-and-orientation of a target object may be used. Edge detection or feature point detection may be performed on a grayscale image, and then the number of edges or feature points contained in a local region may be counted and determined as an evaluation value. Further, using a filter such as a difference-of-Gaussians (DoG) filter, and the sum, square sum, or the total number of the intensities thereof may be determined as an evaluation value. Further, the measurement data does not have to be a grayscale image and may be a range image. Processing similar to the processing performed on a grayscale image may be performed using a distance stored in each pixel of a range image as a luminance, or the similar processing may be performed on a normal map image obtained by calculating a normal from neighboring pixels of each pixel of a range image and converting the x, y, z coordinates of the normal into R, G, B colors. Further, the dispersion (variance) of three-dimensional points of a local region of a range image or a plane fitting error may be used.

The measurement position/orientation determination unit 130 described in the present exemplary embodiment may use any method, not limited to the method described above, which can determine the position-and-orientation of the measuring apparatus 20 in the next measurement of the target object based on the region of interest. The measurement position/orientation determination unit 130 may determine a position-and-orientation that is moved by a minimum step size in the case where the number or area of regions of interest is equal to or larger than a threshold value, as the next measurement position-and-orientation, and the step size may be changed such that the larger the number or area of regions of interest is, the smaller the step size is.

As the number of features used in the registration increases, the evaluation value increases. In the case of a registration feature that is likely to be affected by an appearance change as described above, it is desirable to minutely measure a region of interest that contains more features, i.e., a region of interest with a larger evaluation value. On the other hand, in the case of a registration feature that is less likely to be affected by an appearance change, a region of interest that contains fewer features, i.e., a region of interest with a smaller evaluation value, may be minutely measured. In this way, measurement can be performed in detail on fewer registration features, whereby the time and work needed for the measurement of a registration model that enables stable registration can be decreased.

The measurement position/orientation changing unit 140 described in the present exemplary embodiment may perform processing, not limited to the processing described above, by which the relative position-and-orientations of the measuring apparatus 20 and the measurement target object can arbitrarily be changed. With the position of the measuring apparatus 20 being fixed, the measurement position/orientation changing unit 140 may control the robot controller 104 to cause the robot arm 103 to hold a target object to change the position-and-orientation of the target object. Further, the measuring apparatus 20 and the target object may be attached to respective front ends of different robot arms 103, and the measurement position/orientation changing unit 140 may control each of the robot controllers 104 to change the relative position-and-orientations of the measuring apparatus 20 and the target object. In this case, however, the respective robot arms 103 need to be calibrated to unify the coordinate systems beforehand. Further, a rotation stage or a turntable may be used as a positioning mechanism. A target object placed on a rotation stage may be measured by the fixed measurement data acquisition unit 110, or a rotation stage may be used in combination with a parallel movement stage to move a placed target object to an arbitrary position-and-orientation. The relative position-and-orientations between the robot arm 103 and a rotation/movement stage are calibrated, and the robot arm 103 and the rotation/movement stage may be used in combination.

The registration unit 150 described in the present exemplary embodiment may output a set of range images on which only the registration has been performed, i.e., an integrated three-dimensional point group, instead of outputting a mesh model, depending on the processing performed by the model generation unit 160. Further, the registration unit 150 may output a set of mesh models of range images on which only the registration has been performed. Further, in the case where the measuring apparatus 102 is a camera alone, the registration unit 150 calculates the three-dimensional position of a feature point detected from an image using Structure from Motion, and the like and also calculates the relative position-and-orientations of the cameras. In this case, the registration unit 150 may output measurement data measured by the measurement data acquisition unit 110 and integrated into a single coordinate system.

The model generation unit 160 described in the present exemplary embodiment may be any model generation unit that can extract a geometric feature for use in the estimation of the position-and-orientation of a target object from measurement data integrated into a single coordinate system and can generate a registration model in which the geometric feature is registered. The model generation unit 160 may perform the sampling not from a mesh model but directly from a three-dimensional point group, or the model generation unit 160 may associate a feature point detected from a grayscale image with a feature point detected from another grayscale image, calculate the three-dimensional position of the feature point by triangulation, and register the calculated three-dimensional position.

While the processing up to the generation of a registration model is described in the present exemplary embodiment, the processing may be terminated at the point when the measurement is determined to have been completed in the measurement completion determination performed in step S1060, and the measurement data may be stored in a storage device such as the HDD 17, and then the processing may be terminated. In this case, the measurement data may be read later from the storage device, and the registration processing of step S1070 and the model generation processing of step S1080 may be performed thereon.

With the information processing according to the first exemplary embodiment, the number of times the measurement is performed can be decreased, compared to a case where the measurement is performed at regular intervals, whereby the time and work needed for the measurement can be decreased.

A second exemplary embodiment will be described below. In the first exemplary embodiment, the information processing apparatus determines the next measurement position-and-orientation based on measurement data measured in the previous frame. In the present exemplary embodiment, a method will be described in which the information processing apparatus determines a region of interest and a measurement position-and-orientation from a plurality of pieces of measurement data on which the measurement has been performed. In this way, measurement does not need to be performed repeatedly on a region that is sufficiently measured can be avoided, whereby the time needed for the measurement can be decreased.

Figure 5:
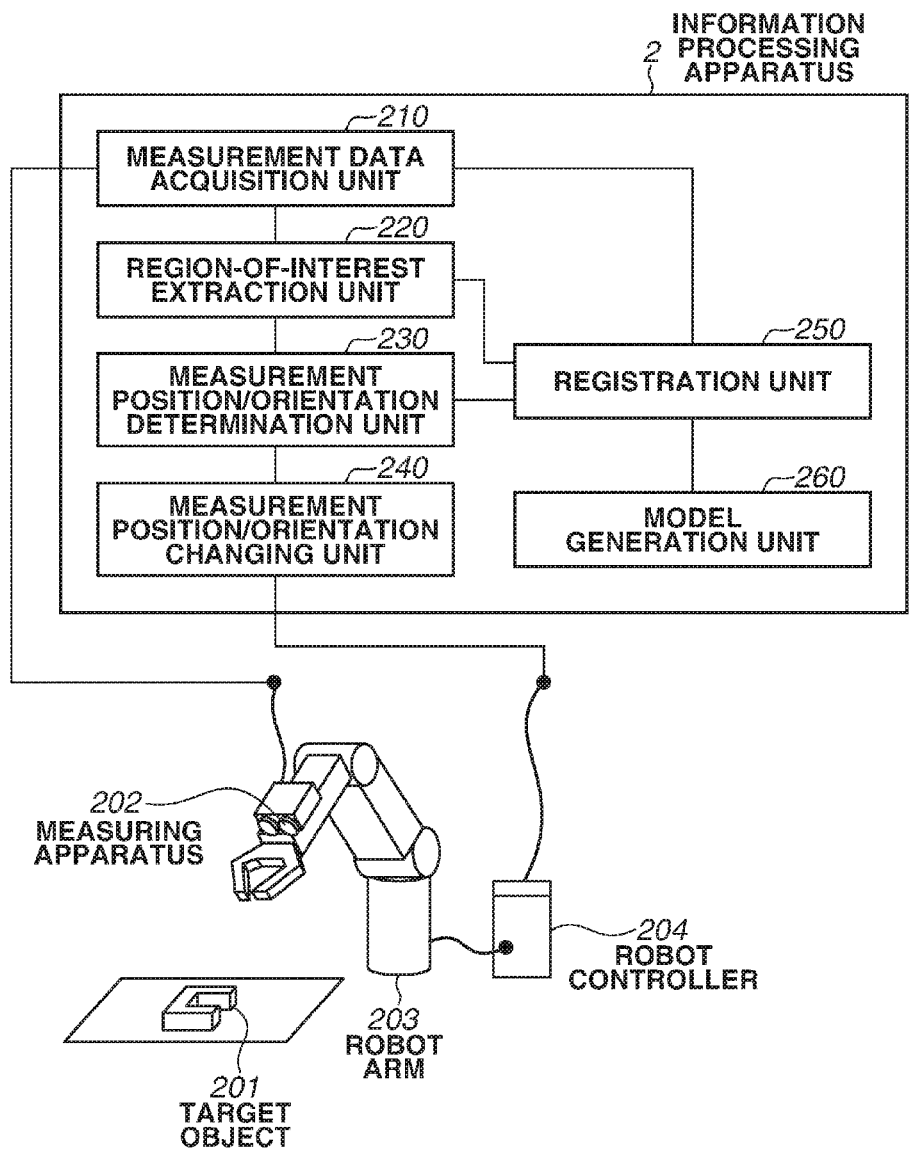
FIG. 5 illustrates an example of a software configuration of an information processing apparatus (No. 2).

The hardware configuration of an information processing apparatus 2 according to the present exemplary embodiment is similar to the hardware configuration of the information processing apparatus 1 according to the first exemplary embodiment. A software configuration of the information processing apparatus 2 is illustrated in FIG. 5. The information processing apparatus 2 includes, as the software configuration, a measurement data acquisition unit 210, a region-of-interest extraction unit 220, a measurement position/orientation determination unit 230, a measurement position/orientation changing unit 240, a registration unit 250, and a model generation unit 260. The foregoing units are substantially similar to the measurement data acquisition unit 110, the region-of-interest extraction unit 120, the measurement position/orientation determination unit 130, the measurement position/orientation changing unit 140, the registration unit 150, and the model generation unit 160 in the first exemplary embodiment, respectively. A difference is in that the region-of-interest extraction unit 220 and the measurement position/orientation determination unit 230 perform processing based on registered measurement data or a mesh model output from the registration unit 250. A robot arm 203 and the like are also similar to the robot arm 103 and the like according to the first exemplary embodiment.

Figure 6:
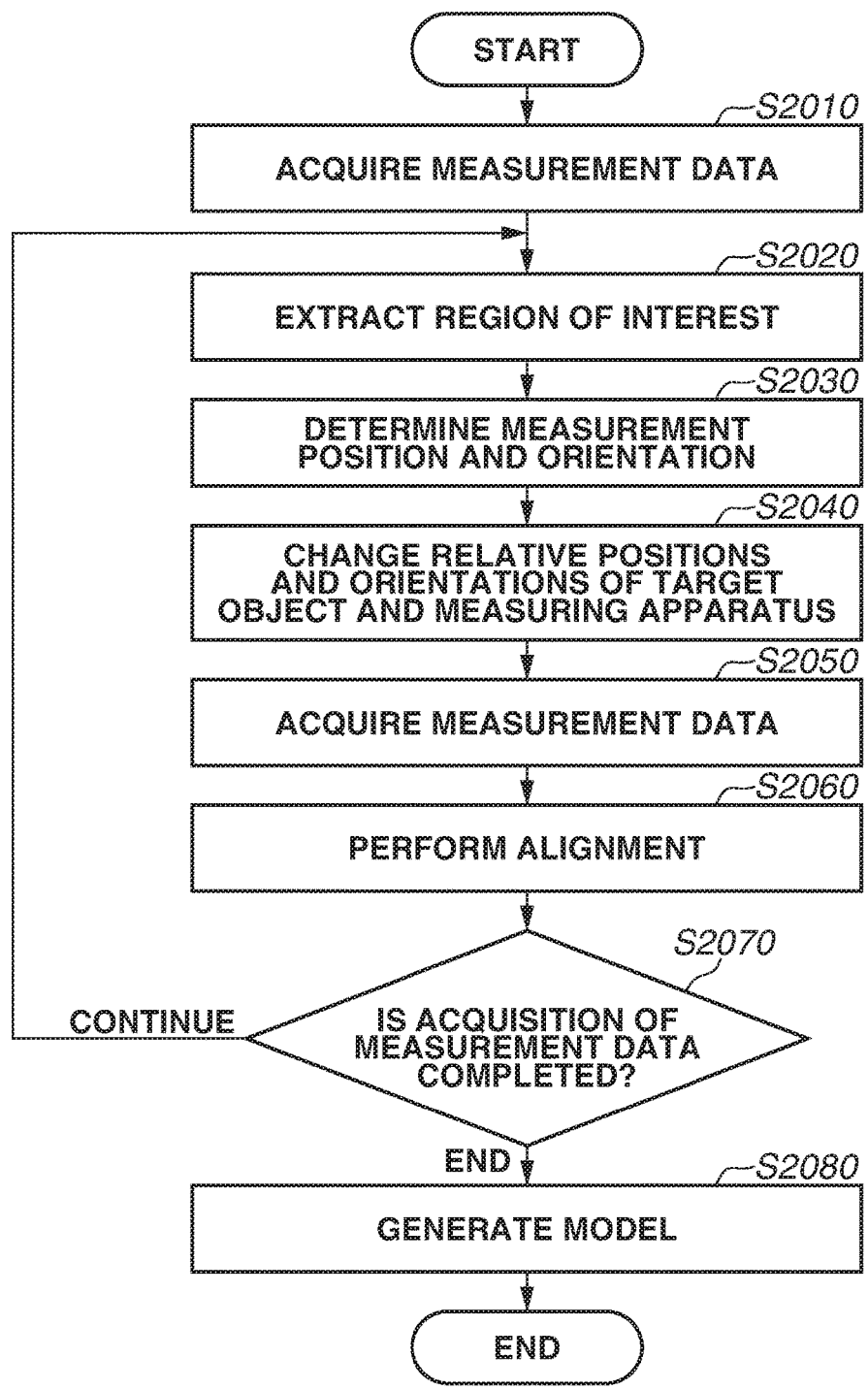
FIG. 6 is a flow chart illustrating an example of information processing of the information processing apparatus (No. 2).

FIG. 6 is a flow chart illustrating information processing performed by the information processing apparatus 2 according to the second exemplary embodiment. The calibration of the measuring apparatus 202, the robot arm 203 and the like and the setting of a path of measurement position-and-orientations are completed in advance. Steps S2010, S2030, S2040, S2050, S2060, S2070, and S2080 are similar to steps S1010, S1030, S1040, S1050, S1070, S1060, and S1080, respectively, so that only step S2020 will be described below.

In step S2020, the region-of-interest extraction unit 220 determines a region of interest, i.e., a region to be measured, of a target object from a mesh model generated by registering and integrating one or more pieces of measurement data and a grayscale image the image-capturing position-and-orientation of which are known. More specifically, the region-of-interest extraction unit 220 extracts a region of interest from the grayscale image by the process of step S1020 described above and determines, from the integrated mesh model, whether the region of interest is measured. The image-capturing position-and-orientation (position-and-orientation of camera) of the measured grayscale image is calculated by the processing performed by the registration unit 250. Thus, the mesh model generated by the registration unit 250 based on the measured data can be converted into a camera coordinate system and projected onto the grayscale image. The region-of-interest extraction unit 220 calculates the degree of unmeasured area that indicates a degree to which missing parts are included in the mesh model projected to the region of interest, and performs the determination. If a portion other than a front surface, i.e., a rear surface or a hole, is projected on a pixel of a region of interest, excluding a background region, the region-of-interest extraction unit 220 can determine that the three-dimensional measurement of that portion is not completed. More specifically, the mesh model is projected and drawn onto the grayscale image, and if an angle formed by the normal of the mesh projected on a pixel of the region of interest and a line-of-sight vector from the origin of the camera to the pixel is equal to or larger than 90 degrees, the rear surface has been projected. Thus, the region-of-interest extraction unit 220 determines that the pixel is unmeasured. Furthermore, the region-of-interest extraction unit 220 determines that the pixel is unmeasured even if the mesh is not projected on the pixel. The region-of-interest extraction unit 220 determines the number of pixels determined to be unmeasured as the degree of unmeasured area of the region of interest. If the degree of unmeasured area is zero, i.e., if there is no unmeasured pixel, the region-of-interest extraction unit 220 excludes the region from the region of interest and determines, as a region of interest, a region with the degree of unmeasured area that is higher than zero. The determination method, however, is not limited to the method described above. The region-of-interest extraction unit 220 may exclude, from the region of interest, a region with the degree of unmeasured area equal to or lower than a threshold value. Further, the degree of unmeasured area does not have to be the number of unmeasured pixels and may be an area or a density.

Further, the measurement data may be any data based on one or more pieces of measurement data of an integrated coordinate system, and the measurement data may be a set of three-dimensional points with normals, a set of mesh models, or pieces of data integrated into a single mesh model. The region-of-interest extraction unit 220 may determine, as a measurement degree, the density of three-dimensional points projected on a region of interest, the area of a continuous plane of a mesh, or the density of three-dimensional points in a surface voxel corresponding to a region of interest in the case where the measured three-dimensional points are segmented into a voxel space. Then, the region-of-interest extraction unit 220 may determine, if the measurement degree is equal to or lower than a threshold value, the region to be unmeasured. In this way, repeated measurement does not need to be performed repeatedly on a region that is sufficiently measured, whereby the time needed for the measurement can be decreased.

Further, in a case where the dispersion (variance) of a point group in a voxel or a plane fitting error is significant, it is considered that the region is difficult to measure and that a lot of noise has occurred therein. Thus, in order to measure the region a large number of times to reduce the noise by a central limit theorem, the region-of-interest extraction unit 220 may determine the region to be unmeasured if the dispersion and the plane fitting residual error are significant and the density of the point group is low. Further, the region-of-interest extraction unit 220 may use the dispersion of a point group in a voxel and the plane fitting error as determination criteria to directly determine whether a region is a region of interest. A region may be selected as a region of interest if the dispersion and the plane fitting error are equal to or larger than a threshold value, whereby the region of interest can be extracted as a three-dimensional region. This can increase the certainty of the determination of measurability, which will be described below in a third exemplary embodiment. As to the measurement data, all the measurement data may be used as the measurement data, or a partial set of measurement data measured at a position-and-orientation that is spatially (or temporally) close to the current position-and-orientation of the measuring apparatus 202 may be used. As used herein, the term "a position-and-orientation that is spatially close" refers to, for example, a position-and-orientation that is within a spatially set range. Further, the term "a position-and-orientation that is temporally close" refers to, for example, a position-and-orientation that is within a temporally set range. Values relating to the foregoing settings are stored in, for example, the HDD 17. For example, the CPU 11 can change the values according to a user operation performed via the input device 16.

With the information processing according to the second exemplary embodiment, measurement does not need to be performed repeatedly on a region that is sufficiently measured can be avoided, whereby the time needed for the measurement can be decreased.

The third exemplary embodiment will be described below. In the first exemplary embodiment described above, the step size to the next measurement position-and-orientation on the path is determined based on the measurement data at the measurement position/orientation determination unit 130. An information processing apparatus according to the present exemplary embodiment considers a plurality of candidates for the measurement position-and-orientation on a measurement position-and-orientation path, predicts how a target object appears from each of the candidates for the measurement position-and-orientation using one or more pieces of acquired measurement data, and determines a measurement position-and-orientation. In this way, it can be determined whether the region of interest is measurable with higher certainty, whereby the time needed for the measurement can be decreased.

A hardware configuration of the information processing apparatus according to the present exemplary embodiment is similar to the hardware configuration according to the first exemplary embodiment, and a software configuration thereof is similar to the software configuration according to the second exemplary embodiment. Further, a flow chart (FIG. 6) of information processing performed thereby is also similar to the flow chart according to the second exemplary embodiment. In the present exemplary embodiment, the processing performed in step S2030, which is the difference between the present exemplary embodiment and the second exemplary embodiment, will be described.

In step S2030, the measurement position/orientation determination unit 230 determines a measurement position-and-orientation on the path in the travelling direction from the current position-and-orientation of the measuring apparatus. More specifically, the measurement position/orientation determination unit 230 randomly generates one or more candidates for the measurement position-and-orientation on the path. If a position-and-orientation is excessively far from the current position-and-orientation, the registration of measurement data becomes difficult, so an upper limit to which a position-and-orientation can be apart from the current position-and-orientation is set. Then, the measurement position/orientation determination unit 230 determines whether a region of interest is measurable from each of the candidates for the measurement position-and-orientation. The measurement position/orientation determination unit 230 projects the region of interest onto a flat surface (work space) on which the target object is placed, and performs the determination. By determining the position-and-orientation of the work space in advance, the measurement position/orientation determination unit 230 can determine with ease whether the region of interest projected on the work space is measurable from each of the candidates for the position-and-orientation. Specifically, the measurement position/orientation determination unit 230 further converts the region of interest projected on the work space into the camera coordinate system to project the region of interest onto the image coordinates of the camera, thereby determining whether the region of interest is within the angle of view of the camera. This is equivalent to the target object visibility determination performed based on the assumption that the thickness of the target object is zero. If the entire region of interest or a portion with the percentage or area that is not smaller than a percentage or area specified by a threshold value is not within the angle of view of the camera, or if the entire region of interest or the portion is within the angle of view of the camera but the area of the region of interest is smaller than a threshold value, the measurement position/orientation determination unit 230 determines the measurement position-and-orientation as an immeasurable position-and-orientation. Then, the measurement position/orientation determination unit 230 excludes the measurement position-and-orientation from the candidates. The measurement position/orientation determination unit 230 selects the closest candidates from the current measurement position-and-orientation among the remaining position-and-orientation candidates and determines the selected position-and-orientation as the next measurement position-and-orientation. In this way, it can be determined whether the region of interest is measurable with higher certainty, whereby the time and work needed for the measurement can be decreased.

The measurement position-and-orientation determination method is not limited to the method described above. Any method can be used by which the measurement position/orientation determination unit 230 can determine, from one or more candidates for the measurement position-and-orientation, a position-and-orientation of the measuring apparatus from which a region of interest can be measured. The measurement position/orientation determination unit 230 may generate a candidate for the measurement position-and-orientation at regular intervals or may randomly select a region of interest from the remaining candidates. The measurement position/orientation determination unit 230 may perform the determination on the measurement position-and-orientation candidates in order of increasing distance from that closest to the current measurement position-and-orientation. Further, the measurement position/orientation determination unit 230 may attach a region of interest to each registered mesh data or integrated mesh data to project the region of interest onto the image coordinate system of the camera and determines the measurability of the region of interest. Further, the measurement position/orientation determination unit 230 may project a three-dimensional point of measured measurement data onto the image coordinate system to project a region of interest onto a flat plane calculated based on a mean depth value and maximum depth value in the region of interest or onto a plane on which the plane fitting has been performed, and then perform the determination. In a case where a region of interest is extracted as a three-dimensional region, the measurement position/orientation determination unit 230 projects the region onto the image coordinates, and if the entire region or a part of the region is within the image, the measurement position/orientation determination unit 230 can determine that the region of interest is measurable.

With the information processing according to the third exemplary embodiment, it can be determined whether a region of interest is measurable with higher certainty, whereby the time and work needed for the measurement can be decreased.

A fourth exemplary embodiment will be described below. In the third exemplary embodiment, the information processing apparatus determines, as a measurement position-and-orientation, a position-and-orientation from which at least one of a region containing an important geometric feature for the estimation of the position-and-orientation of a target object and a region that is not sufficiently measured can be measured. In the present exemplary embodiment, a method will be described in which an information processing apparatus considers the possibility of registration with other measurement data with adequate accuracy and determines the next measurement position-and-orientation. In this way, unnecessary measurement that is not to be used in the model generation because registration with other measurement data is not possible can be decreased, whereby the time needed for the measurement can be decreased. In the present exemplary embodiment, the registration unit 150 performs the registration of mesh models generated from range images using the ICP algorithm in which distances between corresponding points and planes are minimized. Further, a hardware configuration of the information processing apparatus according to the present exemplary embodiment is similar to the hardware configuration according to the first exemplary embodiment. Further, a software configuration of the information processing apparatus according to the present exemplary embodiment is similar to the software configuration according to the second exemplary embodiment, and a flow chart illustrating information processing performed thereby is similar to the flow chart illustrated in FIG. 6.

In the present exemplary embodiment, the measurement position/orientation determination unit 230 provides an evaluation value (recommendation level) to each candidate for the measurement position-and-orientation in step S2030 in the third exemplary embodiment and selects a candidate with the highest recommendation level as the next measurement position-and-orientation. The recommendation level includes a registration possibility Sf, which indicates whether registration with other measurement data with adequate accuracy is possible and whether the registration is easy.

The measurement position/orientation determination unit 230 calculates a registration possibility Sf based on the registration ambiguity calculated from a Jacobian matrix of a geometric feature extracted from a mesh model output by the registration unit 250. In the present exemplary embodiment, the measurement position/orientation determination unit 230 uses three-dimensional positions of front surface points and normals that are sampled from the mesh model as a geometric feature. The Jacobian matrix of a geometric feature refers to a value that indicates the extent to which six-degree-of-freedom parameters of a position-and-orientation are changed when the distance between corresponding geometric features to be focused at the time of performing the registration. More specifically, the Jacobian matrix is a matrix that includes as components first-order partial differential coefficients relating to respective position-and-orientation components when the distance between a point and a flat surface in a three-dimensional space is a function of the position-and-orientation. By looking at the Jacobian matrix of a geometric feature, a parameter among the six-degree-freedom parameters that is more likely to be affected by the geometric feature can be determined. In a case where a specific parameter of the Jacobian matrix is small, this indicates that the effect on the parameter is small, i.e., the parameter is not likely to be determined to result in unsuccessful registration or registration with adequate accuracy is not possible. The following describes a method of deriving the Jacobian matrix of a geometric feature and a method of deriving a registration possibility Sf. As to the relationship between a random error in measurement data and a random error in data amount and space distribution and model fitting, Hoff et al. proposes a method of modeling the propagation of a random error in measurement data to a random error in a result of position-and-orientation estimation. The following describes, using the error propagation framework, a framework for calculating a random error in the position-and-orientation as a registration possibility Sf based on a random error ($\sigma_{range}$) in measurement data, the number of geometric features in measurement data (mesh model) that can be observed, and the space distribution (positions of surface points of observable mesh models) of geometric features in measurement data (mesh model) that can be observed.

A range image, i.e., measurement data, is converted into a mesh model to add normal information to each three-dimensional point. One of the pieces of measurement data to be registered will be referred to as reference data, and the other one as moving data. The registration of the measurement data is performed using the ICP algorithm in which the distance between a local flat surface (three-dimensional point and normal) of the moving data and the three-dimensional point of the reference data is minimized. The measurement position/orientation determination unit 230 can calculate a signed distance err in the three-dimensional space using the following formula:

$$\text{err} = n_x(x'-x) + n_y(y'-y) + n_z(z'-z) \quad \text{(Formula 1)},$$

where $(x, y, z)^T$ are three-dimensional coordinates of a geometric feature (three-dimensional position and normal of surface point) of the moving data in a reference data coordinate system, $(n_x, n_y, n_z)^T$ (unit vector) is a normal direction, and $(x', y', z')^T$ are coordinates of a three-dimensional point that is a geometric feature of the reference data. Then, the measurement position/orientation determination unit 230 partially differentiates the distance err between corresponding points using a parameter $s=(s1, s2, s3, s4, s5, s6)^T$ for the position-and-orientation conversion from the moving data to the reference data, thereby calculating a Jacobian matrix $J_{3D}$ of the geometric feature as follows:

$$J_{3D} = \lfloor n_x n_y n_z (n_z \tilde{y} - n_y \tilde{z})(n_x \tilde{z} - n_z \tilde{x})(n_y \tilde{x} - n_x \tilde{y}) \rfloor, \quad \text{(Formula 2)}$$

where $$\begin{bmatrix} \tilde{x} \\ \tilde{y} \\ \tilde{z} \end{bmatrix} = \tilde{R} \begin{bmatrix} x_m \\ y_m \\ z_m \end{bmatrix}, \quad \text{(Formula 3)}$$

where
$\tilde{R}$
is an orientation conversion matrix from the moving data to the reference data, and $(x_m, y_m, z_m)^T$ are three-dimensional coordinates of the moving data in a moving data coordinate system.

Using a Jacobian matrix J, which is an N×6 matrix in which M pieces of the 1×6 Jacobian matrix $J_{3D}$ are connected, where M is the number of geometric features, an infinitesimal change between the position-and-orientation and observation data can be expressed as a function of an error of first-order approximation of (infinitesimal change Δ of) the position-and-orientation as shown in Formula 4 below. Formula 4 is a relational formula representing an infinitesimal change in an observation data position as a result of an infinitesimal change in the position-and-orientation.

$$J\Delta = e\Delta = J^+ e(J^+ = (J^T J)^{-1} J^T) \quad \text{(Formula 4)}.$$

Based on Formula 4, the measurement position/orientation determination unit 230 calculates a covariance matrix Cov(Δ) of the position-and-orientation from a covariance matrix Cov(e) of the measurement data based on the framework of error inverse propagation. The covariance matrix Cov(e) of the measurement data is expressed by Formula 5 below:

$$\text{Cov}(e) = \begin{bmatrix} \sigma_{range_1^2} & & 0 \\ & \ddots & \\ 0 & & \sigma_{range_M^2} \end{bmatrix}, \quad \text{(Formula 5)}$$

where $\sigma_{range\ j}$ is a distance measurement random error. The measurement position/orientation determination unit 230 calculates the covariance matrix Cov(Δ) of the position-and-orientation from the covariance matrix Cov(e) of the measurement data and the Jacobian matrix J corresponding to each measurement data as follows:

$$\begin{aligned} \text{Cov}(\Delta) = E[\Delta\Delta^T] &= E[J^+ e(J^+ e)^T] \quad \text{(Formula 6)} \\ &= J^+ E[ee^T](J^+)^T \\ &= J^+ \text{Cov}(e)(J^+)^T. \end{aligned}$$

Based on the Formula 6, the measurement position/orientation determination unit 230 can calculate a random error Cov(Δ) in position-and-orientation parameters to be estimated, based on the candidates for the measurement position-and-orientation and the mesh model integrated at the registration unit 250. More specifically, the measurement position/orientation determination unit 230 can calculate the random error Cov(Δ) by inputting to Formula 6 the number of surface points of the mesh model that can be observed from a position-and-orientation of the candidates for the measurement position-and-orientation and are for use in the registration, and a random error in the measurement data, i.e., a random error in the range image. Then, based on a Jacobian Jp of an infinitesimal change in the three-dimensional points on the measurement model with respect to an infinitesimal change in the position-and-orientation, the measurement position/orientation determination unit 230 calculates a covariance matrix of the three-dimensional point coordinates on the mesh model from the covariance matrix of the position-and-orientation.

$$\text{Cov}(P) = J_P \text{Cov}(\Delta) J_P^T \quad \text{(Formula 7)}.$$

The measurement position/orientation determination unit 230 calculates a covariance matrix of the three-dimensional point coordinates for every three-dimensional point on the mesh model and calculates a square root (standard deviation in a direction with the greatest dispersion) of the maximum eigenvalue of the covariance matrix as a random error in a point position. Then, the measurement position/orientation determination unit 230 calculates the maximum value of the random error as a random error in the position-and-orientation and determines the calculated random error as a registration possibility Sf.

Using the registration possibility Sf as an recommendation level, a measurement position-and-orientation candidate with the highest recommendation level is determined as the next measurement position-and-orientation, whereby measurement data that is measured but not used in the model generation because the measurement data cannot be registered with other measurement data can be decreased. Consequently, the time and work needed for the measurement can be decreased.

The recommendation level, however, does not have to be based solely on the registration possibility Sf. The measurement position/orientation determination unit 230 may take into consideration the region of interest and the degree of unmeasured area that are described in the above exemplary embodiments. For example, the measurement position/orientation determination unit 230 uses as a degree of attention Sp, which indicates how many geometric features that are important for the estimation of the position-and-orientation of a target object are contained, the area of a region of interest on an image that is measurable from a candidate for the measurement position-and-orientation. Further, the measurement position/orientation determination unit 230 also uses the degree of unmeasured area described in the second exemplary embodiment, i.e., the number of unmeasured pixels Su of a mesh model projected onto a local region. Then, the measurement position/orientation determination unit 230 can calculate the recommendation level from the weighted sum of all or any of the degree of attention Sp, the degree of unmeasured area Su, and the registration possibility Sf. Further, the recommendation level may be a product of all or any of the degree of attention Sp, the degree of unmeasured area Su, and the registration possibility Sf. The degree of attention Sp may be the dispersion of a point group in a voxel or a plane fitting error that are observable from the position-and-orientation of a candidate for the measurement position-and-orientation in a case where three-dimensional points of measurement data of an integrated coordinate system are segmented into a voxel space, or the degree of attention Sp may be the number of detected geometric features of the grayscale image. The degree of unmeasured area Su may be the area or density of an unmeasured region on an image that is observed from a candidate for the measurement position-and-orientation, or degree of unmeasured area Su may be the density of three-dimensional points or the area of a continuous plane of a mesh that are observable from the position-and-orientation of a candidate for the measurement position-and-orientation. The registration possibility Sf may be the number of continuous planes that are observable from the position-and-orientation of a candidate for the measurement position-and-orientation and have different normals, or may be the dispersion of normals. The evaluation value may be any value that the recommendation level increases as more geometric features important for the estimation of the position-and-orientation of a target object are contained within a measurement range, or more regions that are not sufficiently measured are contained within the measurement range. Further, the evaluation value may be any value that the recommendation level increases as the ease of registration of measurement data acquired in the measurement from the position-and-orientation with other measurement data increases.

With the information processing according to the fourth exemplary embodiment, measurement data that is measured but not used in the model generation because the measurement data cannot be registered with other measurement data can be decreased, whereby the time and work needed for the measurement can be decreased.

A fifth exemplary embodiment will be described below. In the exemplary embodiments described above, the information processing apparatus presets the path of the measurement position. In the present exemplary embodiment, a method will be described in which an information processing apparatus does not preset a measurement position path or, even if the path is preset, changes the path as needed.

A hardware configuration of the information processing apparatus according to the present exemplary embodiment is similar to the hardware configuration according to the first exemplary embodiment. Further, a software configuration of the information processing apparatus according to the present exemplary embodiment is similar to the software configuration according to the second exemplary embodiment, and a flow chart illustrating information processing thereby is similar to the flow chart illustrated in FIG. 6.

In the third and fourth exemplary embodiments, candidates for the position-and-orientation are randomly generated on the measurement path and then an optimum candidate is selected from the generated candidates in the measurement position-and-orientation determination processing of step S2030. In the present exemplary embodiment, the measurement position/orientation determination unit 230 randomly generates candidates for the measurement position-and-orientation from the vicinity of the current position-and-orientation, and selects, from the generated candidates, a candidate with the highest recommendation level described in the fourth exemplary embodiment. The information processing apparatus according to the present exemplary embodiment repeats the foregoing processing in the measurement completion determination processing of step S2070 until there is no more unmeasured region or until the area of an unmeasured region becomes equal to or smaller than a threshold value. A measurement position-and-orientation in the vicinity refers to, for example, a measurement position-and-orientation within a predetermined range from the current position-and-orientation.

In this way, the work of presetting a measurement path can be decreased, and the measurement can be performed on a path that is suitable for the shape of a target object, whereby the work and time needed for the measurement can be decreased.

Further, a method for generating a candidate for the measurement position-and-orientation is not limited to the method described above, and any method can be used by which a candidate for the position-and-orientation from which a target object can be measured can be generated. Randomly generating all parameters of the position-and-orientation brings a consequence that the robot arm is randomly moved. The burden of randomly moving the robot arm is high both mechanically and electrically, so in order to avoid the burden, a limitation may be placed on the random characteristic. If the measurement path is set, the measurement position/orientation determination unit 230 may randomly sample a position within a conical range centered at the path. Further, even if no path is set, the measurement position/orientation determination unit 230 may randomly sample positions from a conical range centered at a spline curved line connecting the past measurement positions. However, the measurement position/orientation determination unit 230 sets the orientation to face toward the center of the work space or the vicinity of the center of the work space. Further, the measurement position/orientation determination unit 230 may randomly change the enlargement factor if the measuring apparatus has a zoom function.

Further, the measurement position/orientation determination unit 230 may determine a vertex of a geodesic dome centered at the target object as a candidate for the measurement position. In this case, the measurement position/orientation determination unit 230 sets the orientation to face toward the center of the dome. Further, for example, the measurement position/orientation changing unit 240 may perform processing as follows in the measurement completion determination processing (step S2070).

Specifically, the measurement position/orientation changing unit 240 may end the measurement if no unmeasured region is detected in the measurement performed from any of the vertexes of the geodesic dome or if the area of an unmeasured region becomes equal to or smaller than a threshold value, and the processing may proceed to step S2080. Further, the measurement position/orientation changing unit 240 may end the measurement if the density of three-dimensional points in the region of interest is not lower than a threshold value, and then the processing may proceed to step S2080.

With information processing according to the fifth exemplary embodiment, the work of presetting a measurement path can be decreased, and the measurement can be performed on a path that is suitable for the shape of a target object, whereby the work and time needed for the measurement can be decreased.

A sixth exemplary embodiment will be described below. In the exemplary embodiments described above, the information processing apparatus calculates a feature amount having a correlation with a geometric feature important for the measurement of the position-and-orientation of a target object from measurement data or a mesh model generated by integrating the measurement data, determines a region having many feature amounts as a region of interest, and calculates the next measurement position-and-orientation. Then, the information processing apparatus determines whether the region of interest is sufficiently measured based on the measured density and the number of times the measurement is performed. In the present exemplary embodiment, a method will be described in which an information processing apparatus serially generates a registration model and confirms whether a geometric feature for use in the measurement of the position-and-orientation of a target object that is detected from measurement data is registered in the registration model, and if the geometric feature is not registered, the information processing apparatus determines a region containing the detected geometric feature as a region of interest. In this way, incomplete measurement can reliably be decreased, whereby the work and time needed for the re-measurement can be decreased.

Figure 7:
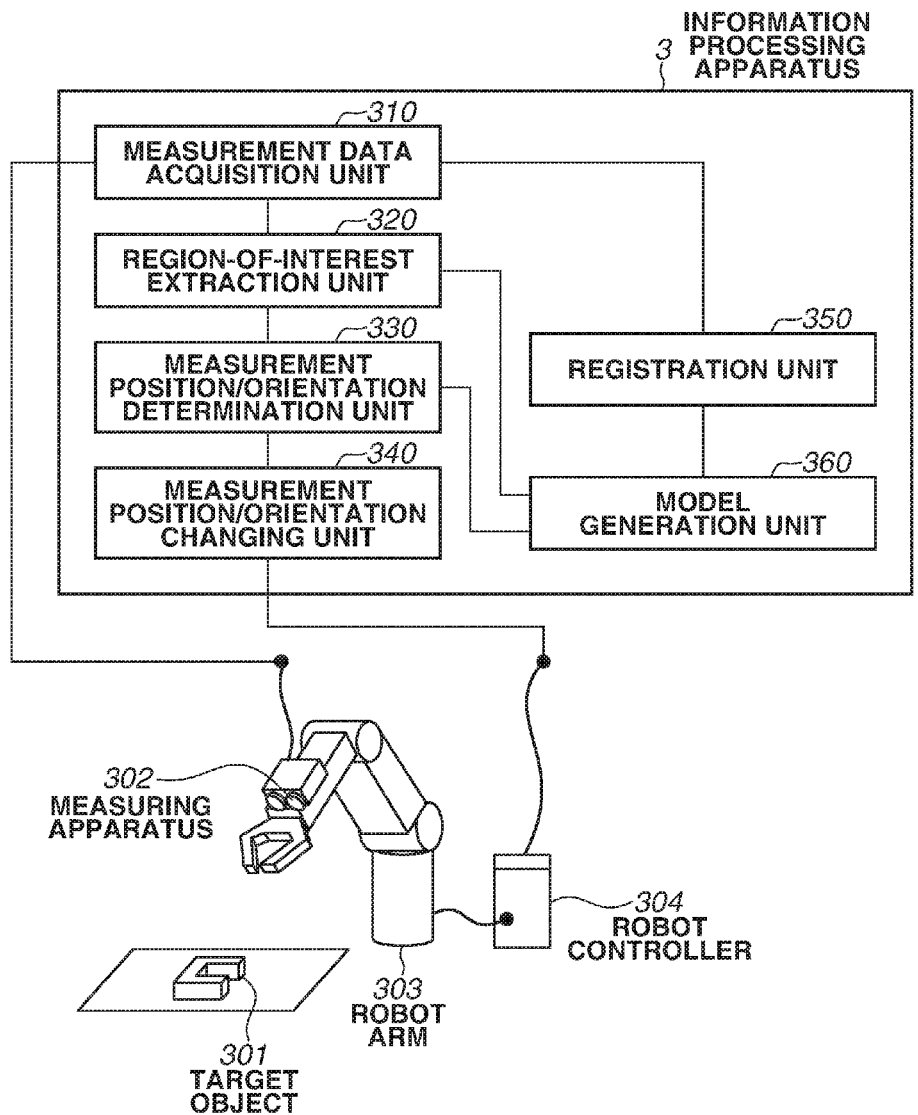
FIG. 7 illustrates an example of a software configuration of an information processing apparatus (No. 3).

A hardware configuration of an information processing apparatus 3 according to the present exemplary embodiment is similar to the hardware configuration according to the first exemplary embodiment. A software configuration of the information processing apparatus 3 is illustrated in FIG. 7. The information processing apparatus 3 includes, as the software configuration, a measurement data acquisition unit 310, a region-of-interest extraction unit 320, a measurement position/orientation determination unit 330, a measurement position/orientation changing unit 340, a registration unit 350, and a model generation unit 360. The foregoing units are substantially similar to the measurement data acquisition unit 110, the region-of-interest extraction unit 120, the measurement position/orientation determination unit 130, the measurement position/orientation changing unit 140, the registration unit 150, and the model generation unit 160 according to the first exemplary embodiment, respectively. A difference is that the region-of-interest extraction unit 320 and the measurement position/orientation determination unit 330 perform processing based on a registration model generated by the model generation unit 360. The robot arm 303 and the like are also similar to the robot arm 103 and the like according to the first exemplary embodiment.

Figure 8:
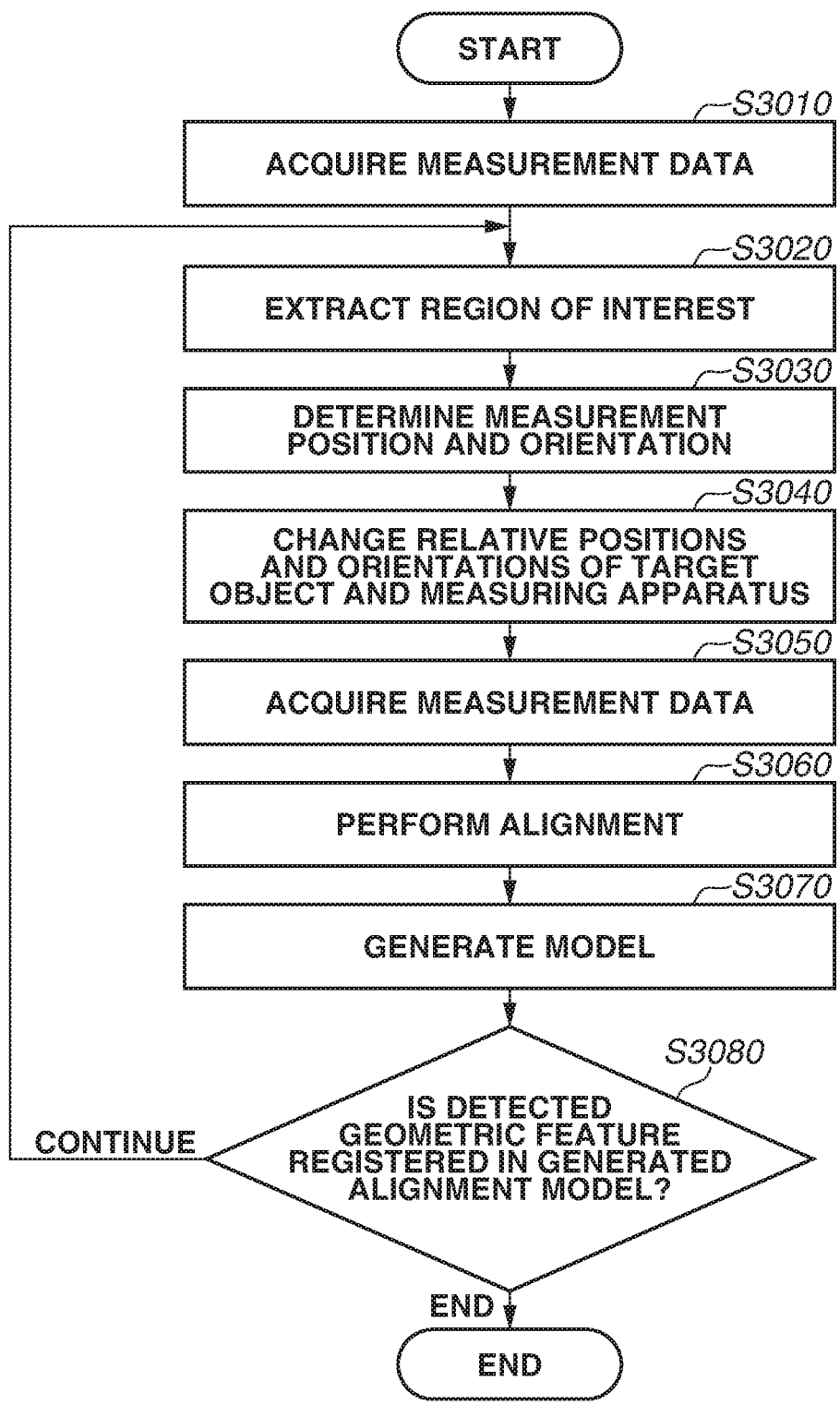
FIG. 8 is a flow chart illustrating an example of information processing of the information processing apparatus (No. 3).

FIG. 8 is a flow chart illustrating the information processing performed by the information processing apparatus according to the sixth exemplary embodiment. The calibration of the measuring apparatus 302, the robot arm 303 and the like and the setting of the path of the measurement position-and-orientation are completed in advance. Steps S3010, S3030, S3040, S3050, S3060, and S3070 are similar to steps S2010, S2030, S2040, S2050, S2060, and S2080, respectively, so only steps S3020 and S3080 will be described.

In step S3020, the region-of-interest extraction unit 320 checks whether a geometric feature detected from measurement data for use in the measurement of the position-and-orientation of the target object is registered in the registration model generated in step S3070, and extracts a region including an unregistered geometric feature as a region of interest. More specifically, the region-of-interest extraction unit 320 performs the following processing. A case will be described in which contour information of a grayscale image and three-dimensional points of a range image are used as geometric features for use in the estimation of the position-and-orientation of a target object. Registration of measurement data is already performed in step S3060. Therefore, the camera position-and-orientation of the grayscale image is known to the region-of-interest extraction unit 320. Thus, the region-of-interest extraction unit 320 projects the contour information registered in the registration model onto the grayscale image. Simultaneously, the region-of-interest extraction unit 320 performs edge detection on the grayscale image. If an edge detected from the grayscale image overlaps the projected contour information, i.e., if the distance between the correspondences is equal to or smaller than a threshold value, this indicates that the geometric feature is registered in the registration model. On the other hand, if no geometric feature corresponding to a detected edge is found, this indicates that the geometric feature is not registered in the registration model (excluding a background region). Accordingly, the region-of-interest extraction unit 320 sets as a region of interest a region containing an edge the corresponding edge of which is not found. Similarly, in the case of the three-dimensional points of the range image, the region-of-interest extraction unit 320 associates the range image of the measurement data with the registration model, and determines as a region of interest a region containing a three-dimensional point the correspondence of which is not found in a target object region. In the completion determination in step S3080, the measurement position/orientation changing unit 340 checks whether there is a region of interest with respect to all pieces of measured data. If there is no region of interest, this indicates that all the detected geometric features are registered in the registration model, so the processing is ended. If no registration model is generated at the beginning of the loop, the information processing apparatus 3 skips step S3020.

In this way, it is checked whether a geometric feature is registered in the registration model, so that incomplete measurement can be decreased, whereby the work and time needed for the re-measurement can be decreased.

A method for the calculation of a region of interest is not limited to the method described above, and the region-of-interest extraction unit 320 may determine a region of interest based on whether a geometric feature detected from measurement data for use in the estimation of the position-and-orientation of the target object is registered in the registration model. In a case where the measurement data for use in the estimation of the position-and-orientation of the target object is a local feature of an image, a geometric feature to be checked is also a local feature of the image. Further, the region-of-interest extraction unit 320 may extract a local region as a region of interest if the number of geometric features in the local region that are not registered in the registration model is equal to or larger than a threshold value. Measurement data to be checked may be the newest measurement data or the entire or a part of measurement data.

Further, in the case where the recommendation level of a candidate for the measurement position-and-orientation is to be calculated in the measurement position-and-orientation determination processing of step S3030 as described above in the fourth exemplary embodiment, the measurement position/orientation determination unit 330 may calculate an evaluation value as described below. The degree of unmeasured area Su may be the number of regions of interest described above or the number or density of geometric features that are not registered in the registration model. Further, the measurement position/orientation determination unit 230 may determine the weighted sum or product of the degree of unmeasured area Su and the registration possibility Sf as an evaluation value. Further, as to the completion determination in step S3070, the measurement position/orientation changing unit 340 may end the measurement when the number of regions of interest becomes equal to or smaller than a threshold value, or may perform the determination based on not all the measured data but a part of the measured data. Further, the information processing apparatus 3 may perform simplified calculation, the calculation speed of which is fast, in the registration processing in step S3060 and the model generation processing in step S3070, and may perform the calculation again with higher accuracy using a longer time after the completion determination.

With the information processing according to the sixth exemplary embodiment, missing of measurement can be decreased, whereby the work and time needed for the re-measurement can be decreased.

A seventh exemplary embodiment will be described below. In the exemplary embodiments described above, the relative position-and-orientations of the measuring apparatus and the target object are changed by the positioning mechanism such as a robot arm. In the present exemplary embodiment, a case will be discussed in which a user holds the measuring apparatus or the target object to change the relative position-and-orientations of the measuring apparatus and the target object, and the measuring apparatus is to acquire measurement data at substantially regular intervals. At this time, in order to minutely acquire regions of interest, an information processing apparatus according to the present exemplary embodiment prompts the user to slowly change the position-and-orientations. In this way, missing of measurement and acquisition of measurement data that is measured but not used in the model generation because the measurement data cannot be registered with other measurement data can be decreased, whereby the time and work needed for the measurement can be decreased. A hardware configuration of an information processing apparatus 4 according to the present exemplary embodiment is similar to the hardware configuration according to the first exemplary embodiment. A software configuration of the information processing apparatus 4 is illustrated in FIG. 9. The information processing apparatus 4 includes, as the software configuration, a measurement data acquisition unit 410, a region-of-interest extraction unit 420, a registration unit 440, and a model generation unit 450. The processing to be performed by each of the foregoing units is similar to the processing of the corresponding unit according to the exemplary embodiments described above. Further, the information processing apparatus 4 also includes an instruction unit 430 as the software configuration. In the present exemplary embodiment, a target object 401 placed in a stationary state in a work space 404 is measured a large number of times with a measuring apparatus 402 held by a user 403 while changing the position-and-orientation of the measuring apparatus 402. Further, a display device 405 and an audio output device 406 are attached to the measuring apparatus 402, and the instruction unit 430 outputs either one or both of a display and a sound to prompt the user 403 to slowly move the measuring apparatus 402. In the present exemplary embodiment, a light emitting device (LED) is attached as the display device 405, and a speaker is attached as the audio output device 406. Based on the measurement data, in a case where minute measurement is desired, the instruction unit 430 lights the LED or causes the LED to blink to prompt the user 403 to slowly move the measuring apparatus 402, and outputs an alarm sound from the speaker.

FIG. 10 is a flow chart illustrating information processing performed by the information processing apparatus according to the seventh exemplary embodiment. Steps S4010, S4020, S4050, S4060, S4070, and S4080 are similar to steps S3010, S3020, S3050, S3060, S3070, and S3080 according to the sixth exemplary embodiment, respectively.

As in the sixth exemplary embodiment, in step S4020, the region-of-interest extraction unit 420 checks whether a geometric feature detected from measurement data for use in the measurement of the position-and-orientation of the target object is registered in the generated registration model, and extracts an unregistered region as a region of interest.

In step S4030, the region-of-interest extraction unit 420 determines the sum of areas of the regions of interest as the degree of attention Sp, and calculates the weighted sum of the degree of unmeasured area Su and the registration possibility Sf described in the fourth exemplary embodiment as the recommendation level.

Then, in step S4040, if the recommendation level is equal to or higher than a threshold value, the instruction unit 430 causes the display device 405 to light up and the audio output device 406 to output an alarm sound so as to prompt the user 403 to slowly move the measuring apparatus 402. Following the display and the alarm sound, the user 403 slowly moves the measuring apparatus 402 to minutely measure a region of interest, an unmeasured region, and a region that is likely to have low registration accuracy. In this way, missing of measurement and measurement data that is measured but not used in the model generation because the measurement data cannot be registered with other measurement data can be decreased, whereby the work and time needed for the measurement can be decreased.

In the present exemplary embodiment, the user 403 holds the measuring apparatus 402 and performs the measurement. However, the user 403 may hold the target object 401 or may hold both the measuring apparatus 402 and the target object 401. Further, while the display device 405 and the audio output device 406 are attached to the measuring apparatus 402 in the present exemplary embodiment, only one of the display device 405 and the audio output device 406 may be attached, or a separately provided display device and a separate audio output device may be used. For example, a display serving as the display device 405 and a speaker serving as the audio output device 406 may be connected to the information processing apparatus 4 to be used. Further, what to be displayed on the display device may be anything that can draw attention of the user 403, such as characters, images, and light. The output from the audio output device may be anything that can draw attention of the user 403, such as an alarm sound and music. For example, sound may be output at regular intervals during the normal time, and the sound output interval may be decreased or increased to draw attention of the user.

Further, the recommendation level may be any of the degree of attention Sp, the degree of unmeasured area Su, and the registration possibility Sf, or may be the product or weighted sum of a combination of the degree of attention Sp, the degree of unmeasured area Su, and/or the registration possibility Sf. Further, the degree of attention Sp does not have to be calculated from the registration model and may be calculated from the previous measurement data, registered measurement data, or the mesh model. The information processing apparatus 4 may perform the registration processing in step S4060 and the model generation processing in step S4070 after the measurement completion determination in step S4080, or may store the measurement data in the storage device such as the HDD 17. without performing the registration processing and the model generation processing, depending on the methods of calculating the region of interest and the recommendation level.

With the information processing according to the seventh exemplary embodiment, missing of measurement and measurement data that is measured but not used in the model generation because the measurement data cannot be registered with other measurement data can be decreased, whereby the work and time needed for the measurement can be decreased.

An eighth exemplary embodiment will be described below. In the seventh exemplary embodiment, the information processing apparatus provides an instruction to the user via the display device and the audio output device. In the present exemplary embodiment, an information processing apparatus projects a range of a region of interest onto a target object to prompt the user to minutely measure the region of interest. In this way, missing of measurement can be decreased, whereby the time and work needed for the measurement can be decreased.

A hardware configuration of the information processing apparatus according to the present exemplary embodiment is similar to the hardware configuration according to the first exemplary embodiment. A software configuration of the information processing apparatus according to the present exemplary embodiment is similar to the software configuration according to the seventh exemplary embodiment, and a flow chart of information processing performed thereby is similar to the flow chart according to the seventh exemplary embodiment. The measuring apparatus 402 according to the present exemplary embodiment includes a projection device and an image capturing device as described above in the first exemplary embodiment. Thus, in the present exemplary embodiment, a range of a region of interest is projected from the projection device. A method of calculating a region of interest is similar to the method according to the seventh exemplary embodiment.

In step S4040, if the recommendation level is equal to or higher than a threshold value, the instruction unit 430 provides an instruction to project from the projection device the range of the region of interest acquired in step S4020. The region of interest is a region on a two-dimensional image captured by the image capturing device, and the projection device and the image capturing device are already calibrated for the distance measurement, so internal parameters (focal length, distortion parameter, etc.) and external parameters (relative position-and-orientations of the projection device and the image capturing device) are already calculated. Thus, the instruction unit 430 can convert a range on an image of the image capturing device into a range on an image of the projection device. Once the region of interest is projected on the target object, the user can check the projection and minutely measure the vicinity of the region of interest by slowly moving the measuring apparatus 402.

In this way, missing of measurement can be decreased, whereby the time and work needed for the measurement can be decreased.

The information processing apparatus according to the present exemplary embodiment may be used in combination with an instruction from the display device and the audio output device described in the seventh exemplary embodiment or may not be used in combination. In the case where the information processing apparatus is not used in combination, the display device 405 and the audio output device 406 are not needed as system components. Further, the projection device included in the measuring apparatus does not have to be used, and a separate projection device may be attached to the measuring apparatus, or the projection device may be placed not on the measuring apparatus but on the work space.

With the information processing according to the eighth exemplary embodiment, missing of measurement can be decreased, whereby the work and time needed for the re-measurement can be decreased.

In an exemplary embodiment of the present disclosure, a program that realizes one or more functions of the exemplary embodiments described above is supplied to a system or an apparatus via a network or a storage medium. Then, one or more processors of a computer of the system or the apparatus may read and execute the program to realize the function(s). Further, a circuit (e.g., application specific integrated circuit (ASIC)) configured to realize one or more functions may realize the function(s).

While the foregoing describes the exemplary embodiments of the present disclosure in detail, the present disclosure is not limited to a specific exemplary embodiment.

For example, a part of or an entire software configuration of the information processing apparatus described above may be included as hardware in the information processing apparatus. Further, the hardware configurations described above are mere examples, and the information processing apparatus may include a plurality of CPUs, communication interfaces, display devices, input devices, and the like. Further, the information processing apparatus may include a function of a robot controller.

Further, the exemplary embodiments described above may arbitrarily be combined and implemented.

With the processing according to each of the exemplary embodiments described above, the time and work needed for the measurement of a target object can be decreased.

Further, shape information for calculating the position-and-orientation of a measurement target object may be generated. This enables measurement of the position-and-orientation of an object to which the CAD model is not applicable, whereby the load of teaching the work such as picking with a robot arm and the like can be decreased.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-125898, filed Jun. 23, 2015, which is hereby incorporated by reference herein in its entirety.

What is claimed is:

1. An information processing apparatus comprising:
one or more memories storing instructions; and
one or more processors which, when executing the instructions, causes the apparatus to:
acquire image data on a target object from an imaging apparatus;
calculate a necessity of being imaged for generating a shape model for use in estimation of a position-and-orientation of the target object, for each of a plurality of regions of the acquired image data;
extract a region of interest from the plurality of regions of the acquired image data, based on the necessity calculated for each of the plurality of regions;
determine a position-and-orientation of the imaging apparatus so as to capture an image of the region of interest;
change a relative position-and-orientation of the target object and the imaging apparatus to the determined position-and-orientation;
register two or more pieces of the acquired image data;
generate a shape model for use in estimation of a position-and-orientation of the target object from the registered image data; and
output the determined position-and-orientation.

2. The information processing apparatus according to claim 1, wherein the one or more processors causes the apparatus to extract a partial region of the image data, of which the necessity is larger than a set value.

3. The information processing apparatus according to claim 2, wherein the one or more processors causes the apparatus to extract a partial region of the image data, of which a feature amount relating to a dispersion of a three-dimensional point group of the image data is larger than a set value.

4. The information processing apparatus according to claim 1, wherein the one or more processors causes the apparatus to associate a geometric feature with a shape model that is generated from one or more pieces of image data and is for use in estimation of a position-and-orientation of the target object, and extract a region containing a geometric feature for which no corresponding shape model is found.

5. The information processing apparatus according to claim 1, wherein the one or more processors causes the apparatus to generate a plurality of candidates for a position-and-orientation of the imaging apparatus, calculate an evaluation value based on one or more pieces of acquired image data, and determine, based on the evaluation value, a next measurement position-and-orientation of the imaging apparatus from the plurality of candidates for the position-and-orientation.

6. The information processing apparatus according to claim 5, wherein, based on one or more pieces of acquired image data or a shape model that is generated from two or more pieces of acquired image data and is for use in estimation of a position-and-orientation of the target object, the one or more processors causes the apparatus to calculate an evaluation value indicating ease of registration of observable image data and imaged data, and determine, based on the evaluation value, a next measurement position-and-orientation of the imaging apparatus from the plurality of candidates for the position-and-orientation.

7. The information processing apparatus according to claim 1, wherein the one or more processors causes the apparatus to generate a plurality of candidates for a position-and-orientation of the imaging apparatus, calculate an evaluation value based on the partial region extracted by the extraction unit, and determine, based on the evaluation value, a next measurement position-and-orientation of the imaging apparatus from the plurality of candidates for the position-and-orientation.

8. The information processing apparatus according to claim 1, wherein the one or more processors causes the apparatus to acquire a range image as the measurement data on the target object from the imaging apparatus.

9. The information processing apparatus according to claim 1, wherein the one or more processors causes the apparatus to acquire a grayscale image as the image data on the target object from the imaging apparatus.

10. An information processing method to be executed by an information processing apparatus, the method comprising:

acquiring image data on a target object from an imaging apparatus;
calculating a necessity of being imaged for generating a shape model for use in estimation of a position-and-orientation of the target object, for each of a plurality of regions of the acquired image data;
extracting a region of interest from the plurality of regions of the acquired image data, based on the necessity calculated for each of the plurality of regions;
determining a position-and-orientation of the imaging apparatus so as to capture an image of the region of interest;
changing a relative position-and-orientation of the target object and the imaging apparatus to the determined position-and-orientation;
registering two or more pieces of the acquired image data;
generating a shape model for use in estimation of a position-and-orientation of the target object from the registered image data; and
outputting the determined position-and-orientation.

11. A non-transitory storage medium storing a program that causes a computer to execute a method comprising:
acquiring image data on a target object from an imaging apparatus;
calculating a necessity of being imaged for generating a shape model for use in estimation of a position-and-orientation of the target object, for each of a plurality of regions of the acquired image data;
extracting a region of interest from the plurality of regions of the acquired image data, based on the necessity calculated for each of the plurality of regions;
determining a position-and-orientation of the imaging apparatus so as to capture an image of the region of interest;
changing a relative position-and-orientation of the target object and the imaging apparatus to the determined position-and-orientation;
registering two or more pieces of the acquired image data;
generating a shape model for use in estimation of a position-and-orientation of the target object from the registered image data; and
outputting the determined position-and-orientation.

12. The information processing apparatus according to claim 1, wherein the one or more processors cause the apparatus to calculate an amount of geometric features or density of geometric features on the partial region, as the necessity.

13. The information processing apparatus according to claim 1, wherein the one or more processors cause the apparatus to calculate an area in the partial region in which no corresponding shape model is found, as the necessity.

* * * * *